United States Patent
Choo et al.

(10) Patent No.: US 8,113,401 B2
(45) Date of Patent: Feb. 14, 2012

(54) APPARATUS FOR CUTTING LIQUID CRYSTAL DISPLAY PANEL

(75) Inventors: Hun-Jun Choo, Kyongsangbuk-do (KR); Ji-Heum Uh, Seoul (KR); Sang-Sun Shin, Kyongsangbuk-do (KR); Hwa-Seob Shim, Kyongsangbuk-do (KR); Jong-Go Lim, Kyongsangbuk-do (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 12/822,847

(22) Filed: Jun. 24, 2010

(65) Prior Publication Data
US 2010/0258605 A1    Oct. 14, 2010

Related U.S. Application Data

(62) Division of application No. 10/455,718, filed on Jun. 6, 2003, now abandoned.

(30) Foreign Application Priority Data

Oct. 22, 2002    (KR) .......................... 10-2002-064677

(51) Int. Cl.
*G02F 1/13*    (2006.01)

(52) U.S. Cl. ............................ 225/96.5; 83/885; 83/100

(58) Field of Classification Search .................... 225/94, 225/96, 96.5; 83/884, 885, 886, 887, 100
See application file for complete search history.

(56) References Cited

U.S. PATENT DOCUMENTS

| | | |
|---|---|---|
| 3,978,580 A | 9/1976 | Leupp et al. |
| 3,991,296 A | 11/1976 | Kojima et al. |
| 4,094,058 A | 6/1978 | Yasutake et al. |
| 4,131,267 A | 12/1978 | Ono et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |

(Continued)

FOREIGN PATENT DOCUMENTS

CN    1348850 A    5/2002

(Continued)

OTHER PUBLICATIONS

Office Action issued by the Korean Patent Office on Jun. 28, 2006.

*Primary Examiner* — Stephen Choi
(74) *Attorney, Agent, or Firm* — McKenna Long & Aldridge, LLP.

(57) ABSTRACT

An apparatus for cutting liquid crystal display panels is disclosed in the present invention. The apparatus includes at least one table receiving bonded mother substrates having a plurality of unit liquid crystal display panels, at least one cutting wheel forming a scribing line on a surface of the bonded mother substrates, and a suction unit coupled to the at least one cutting wheel and sucking in glass debris on the surface of the bonded mother substrates.

7 Claims, 19 Drawing Sheets

U.S. PATENT DOCUMENTS

| | | |
|---|---|---|
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |
| 5,952,676 A | 9/1999 | Sato et al. |
| 5,956,112 A | 9/1999 | Fujimori et al. |
| 6,001,203 A | 12/1999 | Yamada et al. |
| 6,011,609 A | 1/2000 | Kato et al. |
| 6,016,178 A | 1/2000 | Kataoka et al. |
| 6,016,181 A | 1/2000 | Shimada |
| 6,055,035 A | 4/2000 | von Gutfeld et al. |
| 6,163,357 A | 12/2000 | Nakamura |
| 6,219,126 B1 | 4/2001 | Von Gutfeld |
| 6,226,067 B1 | 5/2001 | Nishiguchi et al. |
| 6,236,445 B1 | 5/2001 | Foschaar et al. |
| 6,276,355 B1 | 8/2001 | Zhang et al. |
| 6,304,306 B1 | 10/2001 | Shiomi et al. |
| 6,304,311 B1 | 10/2001 | Egami et al. |
| 6,337,730 B1 | 1/2002 | Ozaki et al. |
| 6,407,360 B1 | 6/2002 | Choo et al. |
| 6,414,733 B1 | 7/2002 | Ishikawa et al. |
| 6,741,320 B2 | 5/2004 | Chae et al. |
| 6,747,725 B2 | 6/2004 | Chae et al. |
| 6,774,978 B2 | 8/2004 | Shin |
| 6,795,154 B2 | 9/2004 | Uh et al. |
| 2001/0021000 A1 | 9/2001 | Egami |

FOREIGN PATENT DOCUMENTS

| | | |
|---|---|---|
| EP | 1 003 066 | 5/2000 |
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | H06-018829 | 1/1994 |
| JP | 6-51256 | 2/1994 |
| JP | H06-064229 | 3/1994 |
| JP | 6-148657 | 5/1994 |
| JP | 6-160871 | 6/1994 |
| JP | H06-194637 | 7/1994 |
| JP | 6-235925 | 8/1994 |
| JP | 6235911 A | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | H07-275770 | 10/1995 |
| JP | H07-275771 | 10/1995 |
| JP | H08-076133 | 3/1996 |
| JP | 8-95066 | 4/1996 |
| JP | 8-101395 | 4/1996 |
| JP | 8-106101 | 4/1996 |
| JP | H08-110504 | 4/1996 |
| JP | H08-136937 | 5/1996 |
| JP | 8-171094 | 7/1996 |
| JP | 8-190099 | 7/1996 |
| JP | H08-173874 | 7/1996 |
| JP | 8-240807 | 9/1996 |
| JP | 9-5762 | 1/1997 |
| JP | 9-26578 | 1/1997 |
| JP | H09-001026 | 1/1997 |
| JP | 9-61829 | 3/1997 |
| JP | 9-73075 | 3/1997 |
| JP | 9-73096 | 3/1997 |
| JP | H09-094500 | 4/1997 |
| JP | 9-127528 | 5/1997 |
| JP | H10-174924 | 6/1997 |
| JP | 9-230357 | 9/1997 |
| JP | 9-281511 | 10/1997 |
| JP | 09-309098 | 12/1997 |
| JP | 09-309736 | 12/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-011966 | 1/1999 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-098176 | 4/2001 |
| JP | 2001-117105 | 4/2001 |
| JP | 2001-117109 | 4/2001 |
| JP | 2001089176 A | 4/2001 |
| JP | 2001-125055 | 5/2001 |
| JP | 2001-133745 | 5/2001 |
| JP | 2001-133794 | 5/2001 |

| | | | | | |
|---|---|---|---|---|---|
| JP | 2001-133799 | 5/2001 | JP | 2002-122873 | 4/2002 |
| JP | 2001-142074 | 5/2001 | JP | 2002-131762 | 5/2002 |
| JP | 2001-147437 | 5/2001 | JP | 2002-139734 | 5/2002 |
| JP | 2001-154211 | 6/2001 | JP | 2002-156518 | 5/2002 |
| JP | 2001-166272 | 6/2001 | JP | 2002-169166 | 6/2002 |
| JP | 2001-166310 | 6/2001 | JP | 2002-169167 | 6/2002 |
| JP | 2001-183683 | 7/2001 | JP | 2002-182222 | 6/2002 |
| JP | 2001-201750 | 7/2001 | JP | 2002-202512 | 7/2002 |
| JP | 2001-209052 | 8/2001 | JP | 2002-202514 | 7/2002 |
| JP | 2001-209056 | 8/2001 | JP | 2002-214626 | 7/2002 |
| JP | 2001-209057 | 8/2001 | JP | 2002-229042 | 8/2002 |
| JP | 2001-209058 | 8/2001 | JP | 2002-236276 | 8/2002 |
| JP | 2001-209060 | 8/2001 | JP | 2002-258299 | 8/2002 |
| JP | 2001-215459 | 8/2001 | JP | 2002-236292 | 9/2002 |
| JP | 2001-222017 | 8/2001 | JP | 2002-277865 | 9/2002 |
| JP | 2001-235734 | 8/2001 | JP | 2002-277866 | 9/2002 |
| JP | 2001-235758 | 8/2001 | JP | 2002-277881 | 9/2002 |
| JP | 2001-255542 | 9/2001 | JP | 2002-287156 | 10/2002 |
| JP | 2001-264782 | 9/2001 | JP | 2002-296605 | 10/2002 |
| JP | 2001-272640 | 10/2001 | JP | 2002-311438 | 10/2002 |
| JP | 2001-281675 | 10/2001 | JP | 2002-311440 | 10/2002 |
| JP | 2001-281678 | 10/2001 | JP | 2002-311442 | 10/2002 |
| JP | 2001-282126 | 10/2001 | JP | 2002-323687 | 11/2002 |
| JP | 2001-305563 | 10/2001 | JP | 2002-323694 | 11/2002 |
| JP | 2001-311819 | 11/2001 | JP | 2002-333628 | 11/2002 |
| JP | 2001-330837 | 11/2001 | JP | 2002-333635 | 11/2002 |
| JP | 2001-330840 | 11/2001 | JP | 2002-333843 | 11/2002 |
| JP | 2001-356353 | 12/2001 | JP | 2002-341329 | 11/2002 |
| JP | 2001-356354 | 12/2001 | JP | 2002-341355 | 11/2002 |
| JP | 2002-14360 | 1/2002 | JP | 2002-341356 | 11/2002 |
| JP | 2002-23142 | 1/2002 | JP | 2002-341357 | 11/2002 |
| JP | 2002-23176 | 1/2002 | JP | 2002-341358 | 11/2002 |
| JP | 2002-037638 | 2/2002 | JP | 2002-341359 | 11/2002 |
| JP | 2002-49045 | 2/2002 | JP | 2002-341362 | 11/2002 |
| JP | 2002-079160 | 3/2002 | KR | 1998-049779 | 10/1998 |
| JP | 2002-080321 | 3/2002 | KR | 2000-0035302 | 6/2000 |
| JP | 2002-82340 | 3/2002 | KR | 10-2001-0058683 | 7/2001 |
| JP | 2002-90759 | 3/2002 | TW | 175696 | 12/1991 |
| JP | 2002-90760 | 3/2002 | WO | WO 02/057192 | 7/2002 |
| JP | 2002-107740 | 4/2002 | WO | WO-02057192 * | 7/2002 |
| JP | 2002-122870 | 4/2002 | | | |
| JP | 2002-122872 | 4/2002 | | | |

* cited by examiner

APPARATUS FOR CUTTING LIQUID CRYSTAL DISPLAY PANEL

This application is a divisional of U.S. patent application Ser. No. 10/455,718, filed on Jun. 6, 2003 now abandoned, which claims the benefit of the Korean Application No. P2002-064677, filed on Oct. 22, 2002, all of which are hereby incorporated by reference for all purposes as if fully set forth herein.

BACKGROUND OF THE INVENTION

1. Field of the Invention

The present invention relates to a liquid crystal display panel, and more particularly, to an apparatus for cutting a liquid crystal display panel to separate a plurality of unit liquid crystal display panels from a mother substrate.

2. Discussion of the Related Art

Generally, a liquid crystal display device provides liquid crystal cells arranged in a matrix form with corresponding data signals according to image information in order to display a desired image by controlling light-transmittance of each liquid crystal cell.

Accordingly, the liquid crystal display device is provided with a liquid crystal display panel where a plurality of liquid crystal cells of a unit pixel are arranged in a matrix form, and a driver integrated circuit for driving the liquid crystal cells of the liquid crystal display panel.

The liquid crystal display panel is composed of a color filter substrate and a thin film transistor array substrate attached to face to each other, and a liquid crystal layer filled between the two substrates.

On the thin film transistor array substrate of the liquid crystal display panel, a plurality of data lines for transmitting data signals supplied from a data driver integrated circuit to the liquid crystal cells are perpendicular to a plurality of gate lines for transmitting scan signals supplied from a gate driver integrated circuit to the liquid crystal cells. Herein, the liquid crystal cells are arranged at each intersection of the data lines and the gate lines.

The gate driver integrated circuit sequentially supplies the scan signals to the plurality of gate lines so that the liquid crystal cells arranged in a matrix form can be sequentially selected line by line. Also, the data signals are supplied to the liquid crystal cells of the selected one line from the data driver integrated circuit through a plurality of data lines.

In the meantime, a common electrode and a pixel electrode are respectively formed at the inner sides of the color filter substrate and the thin film transistor array substrate facing into each other, thereby applying an electric field to the liquid crystal layer. At this time, as opposed to the pixel electrode, which is formed correspondingly to each liquid crystal cell formed on the thin film transistor array substrate, the common electrode is integrally formed on the entire surface of the color filter substrate. Accordingly, light-transmittance of the liquid crystal cells can be individually controlled by controlling a voltage applied to the pixel electrode when a voltage is applied to the common electrode.

Similarly, a thin film transistor used as a switching device is formed at the respective liquid crystal cells in order to control the voltage applied to the pixel electrode formed on each liquid crystal cell.

Meanwhile, the thin film transistor array substrates are formed on a large mother substrate and the color filter substrates are formed on another mother substrate. The two mother substrates are then bonded, so that a plurality of liquid crystal display panels are formed at the same time to improve yield. Herein, a process for cutting the bonded substrates into unit liquid crystal display panels is required.

Generally, the cutting process of the unit liquid crystal display panels includes forming a scribing line at a surface of the mother substrate by a diamond wheel having a hardness greater than that of glass, and breaking the substrate by applying a mechanical force thereto. Hereinafter, a typical liquid crystal display panel will be explained with reference to the accompanied drawings.

FIG. 1 is a schematic view showing a related art unit liquid crystal display panel prepared by bonding a thin film transistor array substrate and a color filter substrate of the liquid crystal display device.

As shown in FIG. 1, a liquid crystal display panel 10 includes an image display unit 13 having liquid crystal cells arranged in a matrix form, a gate pad unit 14 connected to gate lines of the image display unit 13, and a data pad unit 15 connected to data lines. At this time, the gate pad unit 14 and the data pad unit 15 are formed on the end portions of a thin film transistor array substrate 1 which does not overlap with a color filter substrate 2. The gate pad unit 14 provides a scan signal supplied from a gate driver integrated circuit to the gate lines of the image display unit 13, and the data pad unit 15 provides image information supplied from a data driver integrated circuit to the data lines of the image display unit 13.

On the thin film transistor array substrate 1 of the image display unit 13, the data lines are arranged to be perpendicular to the gate lines. Then, thin film transistors are formed at each intersection to switch the liquid crystal cells. Pixel electrodes are connected to the thin film transistors to drive the liquid crystal cells. A passivation layer is formed on the entire surface of the thin film transistor array substrate 1 to protect the electrodes and the thin film transistors.

Also, the color filters separated by a black matrix for each cell area are formed on the color filter substrate 2 of the pixel display unit 13. Additionally, a transparent common electrode as a counter electrode of the pixel electrode is formed on the color filter substrate 2.

A cell gap is provided between the thin film transistor array substrate 1 and the color filter substrate 2, which are bonded to each other by a sealant (not shown) formed at the periphery of the image display unit 13, so as to be spaced apart from each other. A liquid crystal layer (not shown) is formed in the space between the thin film transistor array substrate 1 and the color filter substrate 2.

FIG. 2 is a cross-sectional view showing a first mother substrate having thin film transistor array substrates 1 and a second mother substrate having color filter substrates 2, wherein the first and second mother substrates are bonded to each other to form a plurality of liquid crystal display panels.

As shown in FIG. 2, each unit liquid crystal display panel has the end portions of the thin film transistor array substrate 1 protruding longer than the color filter substrate 2. This is because the gate pad unit 14 and the data pad unit 15 are formed at the end portions of the thin film transistor array substrate 1 which does not overlap with the color filter substrate 2.

Hence, the second mother substrate 30 and the color filter substrates 2 formed thereon are spaced apart from each other by a dummy region 31 corresponding to the protruding area of each thin film transistor array substrate 1 on the first mother substrate 20.

Moreover, the unit liquid crystal display panels are arranged so as to maximize the use of the first and second mother substrates 20 and 30. Although it may vary depending on the model, the unit liquid crystal display panels are generally spaced apart from each other at a distance corresponding to a second dummy region 32.

After the first mother substrate 20 having the thin film transistor array substrates 1 is bonded to the second mother substrate 30 having the color filter substrates 2, a scribing process and a breaking process are carried out to individually cut each of the liquid crystal display panels. In this case, the first dummy region 31 formed between each color filter substrate 2 of the second mother substrate 30 and the second dummy region 32 formed between each unit liquid crystal display panel are removed at the same time.

The related art cutting process of the unit liquid crystal display panels will be explained with reference to FIGS. 3A to 3J.

As shown in FIG. 3A, the first mother substrate 20 and the second mother substrate 30 bonded to each other are loaded on a first table 33.

Then, as shown in FIG. 3B, the first table 33 moves in one direction to a previously set distance to sequentially form a first scribing line 42 on the first mother substrate 20 through a cutting wheel 41.

Then, as shown in FIG. 3C, the first and second mother substrates 20 and 30 are turned by about 90°. The first table 33 moves back to its initial location at the previously set distance to sequentially form a second scribing line 43 on a surface of the first mother substrate 20 through the cutting wheel 41.

The cutting wheel 41 is bonded to the surface of the first mother substrate 20 with a constant pressure to be rotated, thereby forming the first and second scribing lines 42 and 43 having a groove on the surface of the first mother substrate 20.

Then, as shown in FIG. 3D, the first and second mother substrates 20 and 30 are overturned and are loaded on a second table 34. The second table 34 moves in one direction at a previously set distance, and propagates a crack on the first mother substrate 20 along the second scribing line 43 by pressing the second mother substrate 30 with a breaking rod 44.

As shown in FIG. 3E, after the second and first mother substrates 30 and 20 are turned by about 90°, the second table 34 moves back to its initial location at the previously set distance, and propagates a crack on the first mother substrate 20 along the first scribing line 42 by pressing the second mother substrate 30 with the breaking rod 44.

As shown in FIG. 3F, after the second and first mother substrates 30 and 20 are loaded on a third table 35, the third table 35 moves in one direction at a previously set distance to sequentially form a third scribing line 46 on the surface of the second mother substrate 30 through a cutting wheel 45.

As shown in FIG. 3G, the second and first mother substrates 30 and 20 are turned by about 90°, and the third table 35 moves back to the initial location at the previously set distance to sequentially form a fourth scribing line 47 on the surface of the second mother substrate 30 through the cutting wheel 45.

The cutting wheel 45 is bonded to the surface of the second mother substrate 30 with a constant pressure to be rotated, thereby forming the third and fourth scribing lines 46 and 47 having a groove on the surface of the second mother substrate 30.

As shown in FIG. 3H, the second and first mother substrates 30 and 20 are overturned to be loaded on a fourth table 36. The fourth table 36 moves in one direction at a previously set distance and propagates a crack on the second mother substrate 30 along the fourth scribing line 47 by pressing the first mother substrate 20 with a breaking rod 48.

As shown in FIG. 3I, after the first and second mother substrates 20 and 30 are turned by about 90°, the fourth table 36 moves back to the initial location at the previously set distance and propagates a crack on the second mother substrate 30 along the third scribing line 46 by pressing the first mother substrate 20 with the breaking rod 48.

As shown in FIG. 3J, the first and second mother substrates 20 and 30 are cut into unit liquid crystal display panels as the cracks are propagated along the first to fourth scribing lines 42, 43, 46, and 47 on the first and second mother substrates 20 and 30. The unit liquid crystal display panels are selectively unloaded using a suction plate 49 to be transferred to equipment for a later process.

In the related art apparatus for cutting liquid crystal display panels, when the scribing lines having a groove are formed on the surface of the substrate by bonding the cutting wheel to the surface of the substrate with a constant pressure and turning, glass debris are generated from a friction between the cutting wheel and the substrate.

When the glass debris are adhered to the surface of the substrate or the table on which the substrate is loaded, it causes a scratch or stain thereon.

The scratch or stain generated on the surface of the substrate deteriorates a picture quality of the liquid crystal display device, thereby increasing the defective proportions of a product and lowering productivity.

SUMMARY OF THE INVENTION

Accordingly, the present invention is directed to an apparatus for cutting a liquid crystal display panel that substantially obviates one or more of problems due to limitations and disadvantages of the related art.

Another object of the present invention is to provide an apparatus for cutting liquid crystal display panels, which prevents the glass debris generated by the friction between a cutting wheel and a substrate from being adhered to the surface of the substrate or a table on which the substrate is loaded.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for cutting liquid crystal display panels includes at least one table receiving bonded mother substrates having a plurality of unit liquid crystal display panels, at least one cutting wheel forming a scribing line on a surface of the bonded mother substrates, and a suction unit coupled to the at least one cutting wheel and sucking in glass debris on the surface of the bonded mother substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
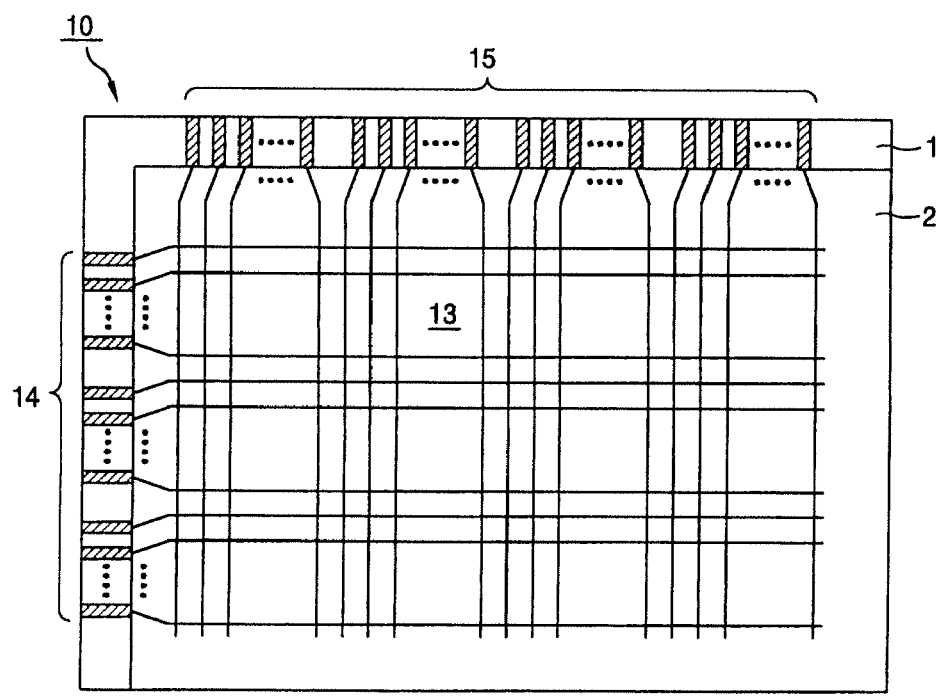
FIG. 1 is a schematic plane view showing a related art unit liquid crystal display panel prepared by bonding a thin film transistor array substrate and a color filter substrate to each other.
Figure 2:
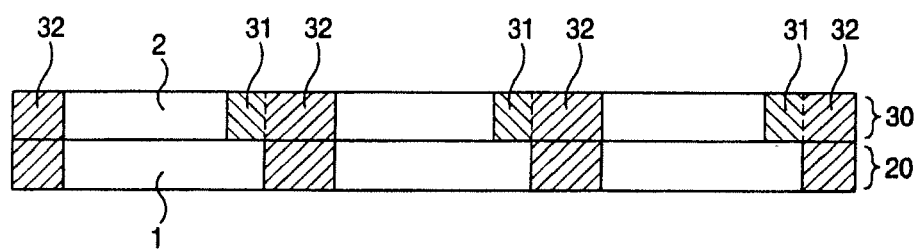
FIG. 2 is a cross-sectional view showing a first mother substrate having thin film transistor array substrates and a second mother substrate having color filter substrates according to the related art.
Figure 3A:
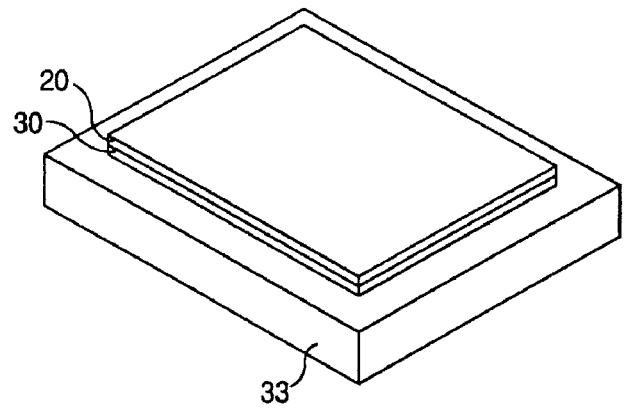
FIGS. 3A to 3J are perspective views sequentially showing a process for cutting unit liquid crystal display panels according to the related art.
Figure 3B:
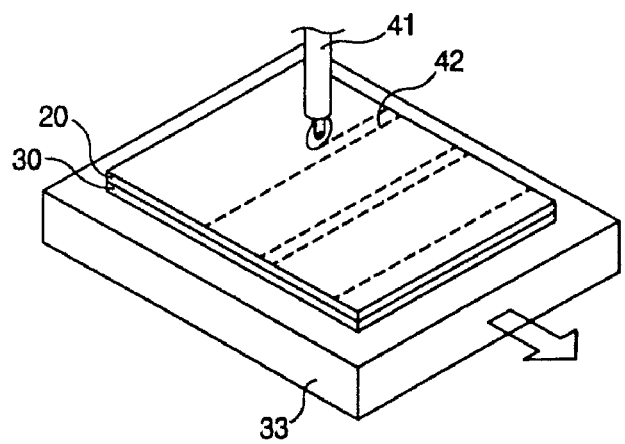
Figure 3C:
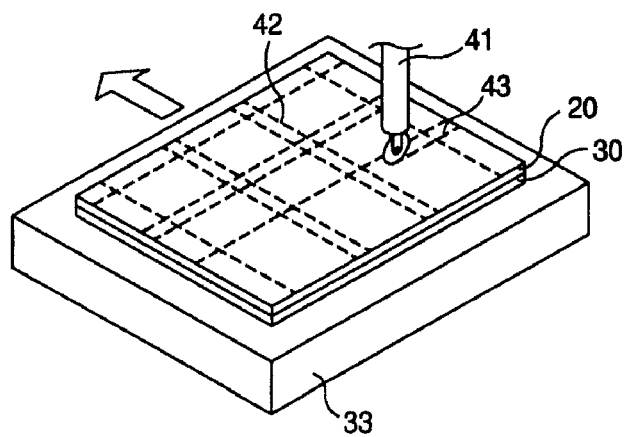
Figure 3D:
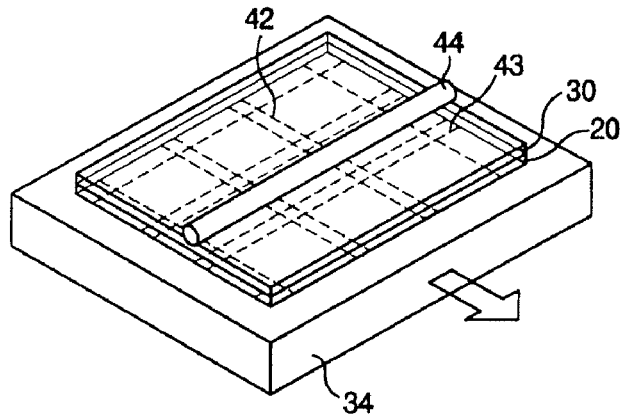
Figure 3E:
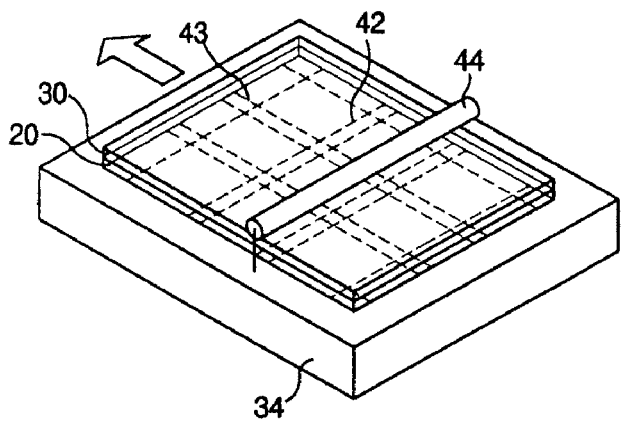
Figure 3F:
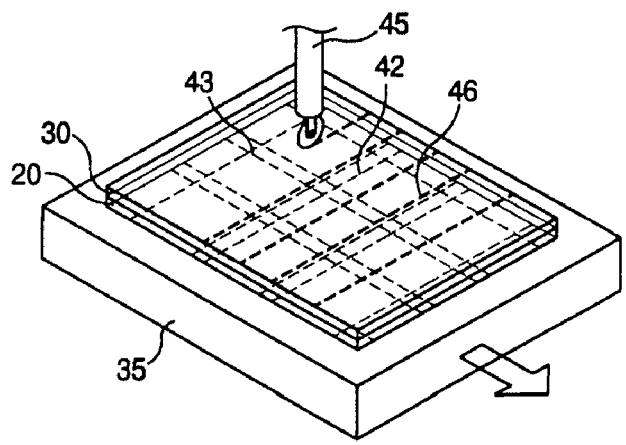
Figure 3G:
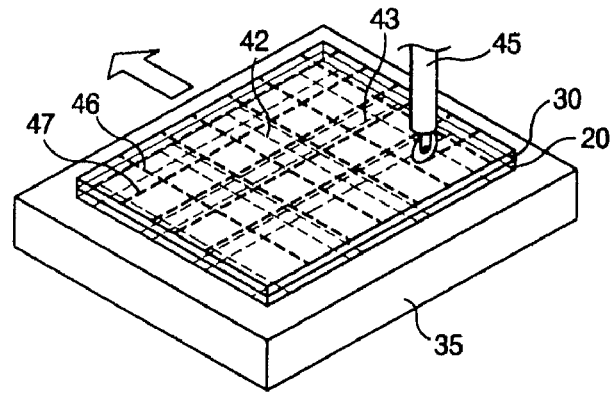
Figure 3H:
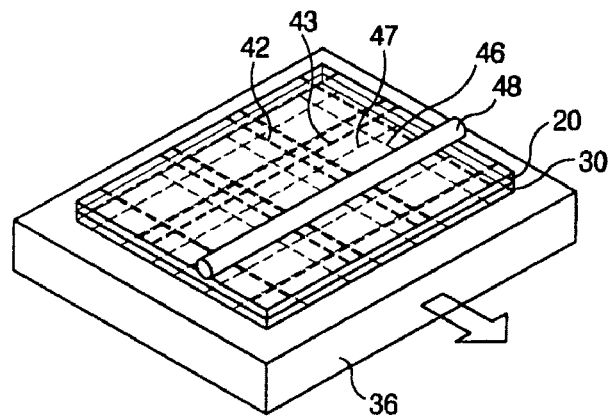
Figure 3I:
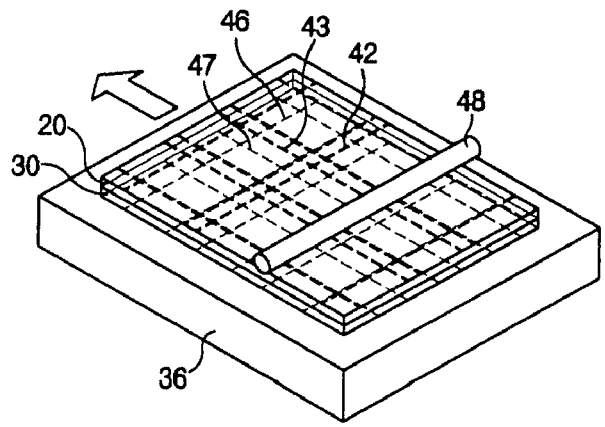
Figure 3J:
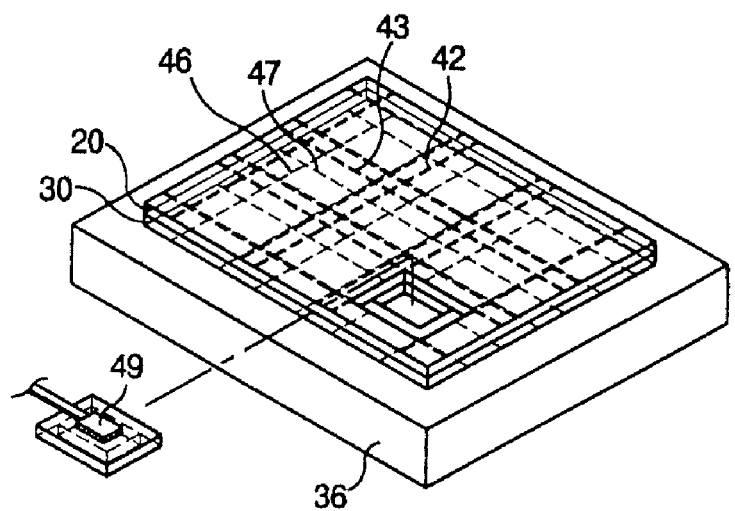
Figure 4:
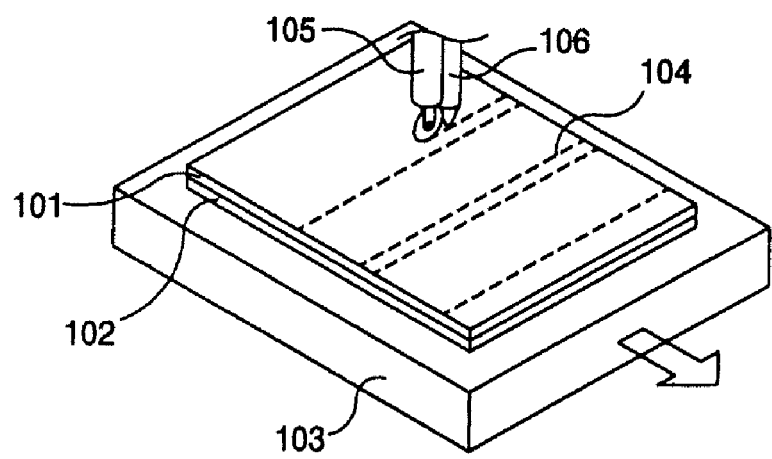
FIG. 4 is a schematic view showing an apparatus for cutting liquid crystal display panels according to a first embodiment of the present invention.

FIG. 4 is a schematic view showing an apparatus for cutting liquid crystal display panels according to a first embodiment of the present invention. As shown in FIG. 4, the apparatus for cutting liquid crystal display panels according to the first embodiment of the present invention includes a table 103 on which a first mother substrate 101 and a second mother substrate 102 are loaded, a cutting wheel 105 for forming a scribing line 104 on the surfaces of the first and second mother substrates 101 and 102, and a suction unit 106 provided at the cutting wheel 105 for sucking in glass debris generated from a friction between the cutting wheel 105 and the first mother substrate 101 or between the cutting wheel 105 and the second mother substrate 102.

In the apparatus for cutting liquid crystal display panels according to the first embodiment of the present invention, the cutting wheel 105 is rolled onto the surface of the first mother substrate 101 or the second mother substrate 102 with a constant pressure, thereby forming the scribing line 104 such as a groove on the surface of the first mother substrate or the second mother substrate 102. The suction unit 106 is connected with the cutting wheel 105, and the cutting wheel 105 sucks in glass debris generated on the surface of the first mother substrate 101 or the second mother substrate 102. The glass debris are generated from the friction between the cutting wheel 105 and the first mother substrate 101 or the second mother substrate 102.

Processes for cutting liquid crystal display panels by using the first embodiment of the present invention will be explained with reference to FIGS. 5A to 5J.

Figure 5A:
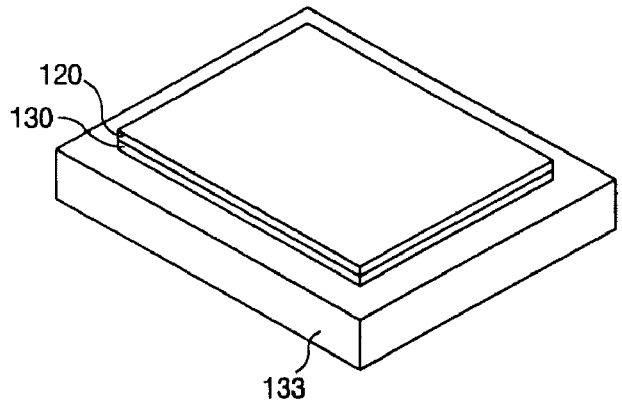
FIGS. 5A to 5J are perspective views sequentially showing a process for cutting liquid crystal display panels using the apparatus for cutting liquid crystal display panels according to the first embodiment of the present invention.

First, as shown in FIG. 5A, the first mother substrate 120 and the second mother substrate 130 are loaded on the first table 133.

The attached first and second mother substrates 120 and 130 are used to form the thin film transistor array substrate and the color filter substrate formed of glass.

On the thin film transistor array substrate, the data lines having image information applied thereto are arranged to perpendicularly cross the gate lines having scan signals applied thereto. Then, thin film transistors are formed at each intersection to switch liquid crystal cells. Pixel electrodes are connected to the thin film transistors to drive the liquid crystal cells. A passivation layer is formed on the entire surface of the thin film transistor array substrate to protect the electrodes and the thin film transistors.

Also, on the color filter substrate, color filters separated by a black matrix for each cell area are formed. Additionally, a transparent common electrode as a counter electrode of the pixel electrode is formed on the color filter substrate.

Figure 5B:
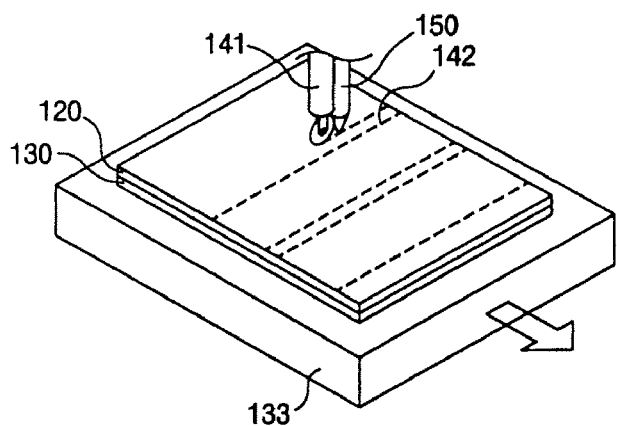

As shown in FIG. 5B, the first table 133 moves in one direction, and a cutting wheel 141 is rolled onto the surface of the first mother substrate 120 with a constant pressure, thereby sequentially forming a first scribing line 142 on the first mother substrate 120. At this time, a suction unit 150 is connected with the cutting wheel 141 to suck in the glass debris generated on the surface of the first mother substrate 120 by the friction between the cutting wheel 141 and the first mother substrate 120.

Figure 5C:
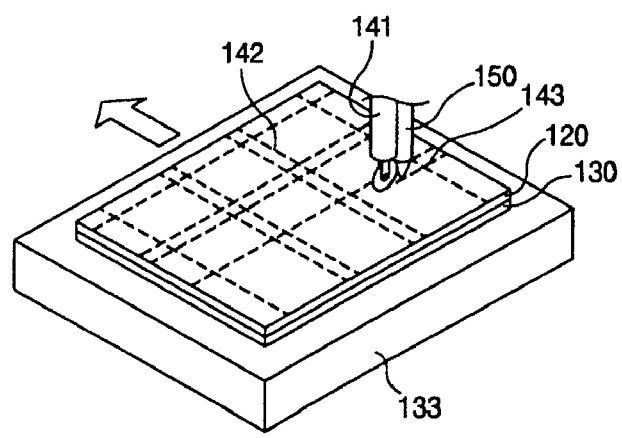

As shown in FIG. 5C, the first and second mother substrates 120 and 130 are turned by about 90° and the first table 133 moves back to the initial location. Subsequently, the cutting wheel 141 is rolled onto the surface of the first mother substrate 120 with applying a constant pressure, thereby sequentially forming a second scribing line 143 on the surface of the first mother substrate 120. At this point, the suction unit 150 is connected with the cutting wheel 141 to suck in the glass debris generated on the surface of the first mother substrate 120 by the friction between the cutting wheel 141 and the first mother substrate 120.

Figure 5D:
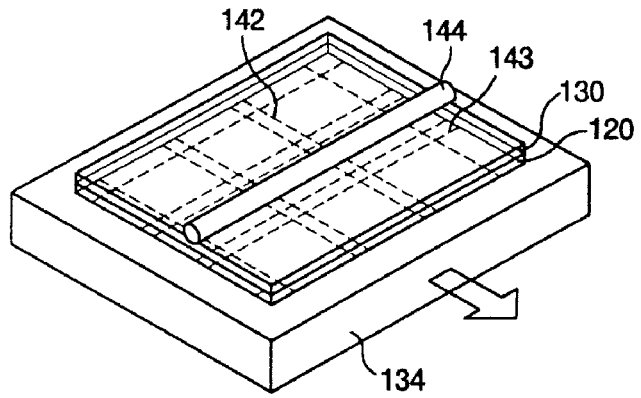

As shown in FIG. 5D, the first and second mother substrates 120 and 130 are overturned to be loaded on a second table 134. Subsequently, the second table 134 moves in one direction, and propagates a crack in the first mother substrate 120 along the second scribing line 143 by pressing the second mother substrate 130 with a breaking rod 144.

Figure 5E:
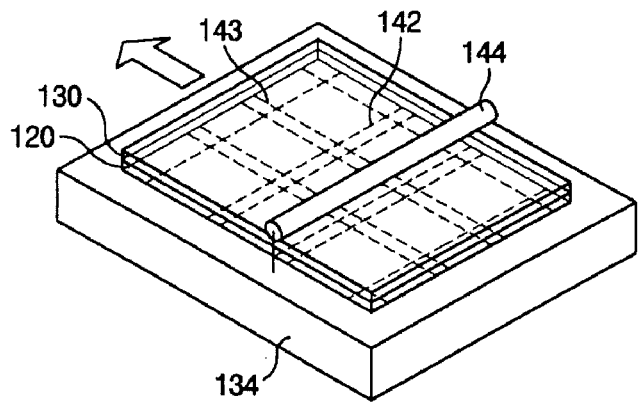

As shown in FIG. 5E, the second and first mother substrates 130 and 120 are turned by about 90°. The second table 134 moves back to the initial location, and propagates a crack on the first mother substrate 120 along the first scribing line 142 by pressing the second mother substrate 130 with the breaking rod 144.

Figure 5F:
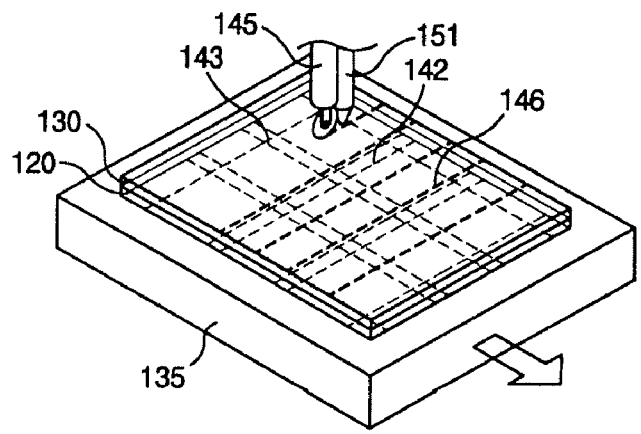

As shown in FIG. 5F, the second and first mother substrates 130 and 120 are loaded on a third table 135, and the third table 135 moves in one direction. A cutting wheel 145 is rolled onto the surface of the second mother substrate 130 with applying a constant pressure, thereby sequentially forming a third scribing line 146 on the surface of the second mother substrate 130. At this point, the suction unit 151 is connected with the cutting wheel 145 to suck in the glass debris generated on the surface of the second mother substrate 130 by the friction between the cutting wheel 145 and the second mother substrate 130.

Figure 5G:
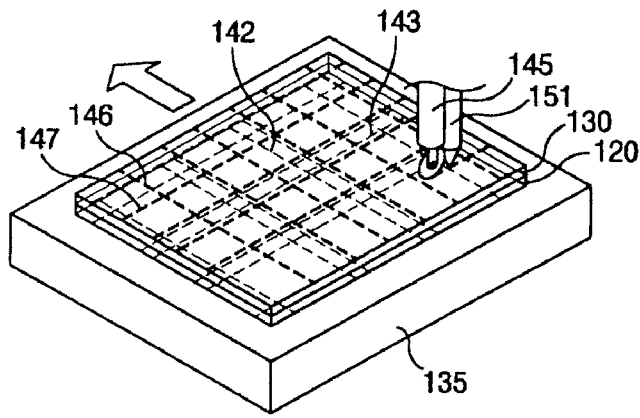

As shown in FIG. 5G, the second and first mother substrates 130 and 120 are turned by about 90° and the third table 135 moves back to the initial location. The cutting wheel 145 is rolled onto the surface of the second mother substrate 130 with applying a constant pressure, thereby sequentially forming a fourth scribing line 147 on the surface of the second mother substrate 130. At this time, the suction unit 151 is connected with the cutting wheel 145 to suck in the glass debris generated on the surface of the second mother substrate 130 by the friction between the cutting wheel 145 and the second mother substrate 130.

Figure 5H:
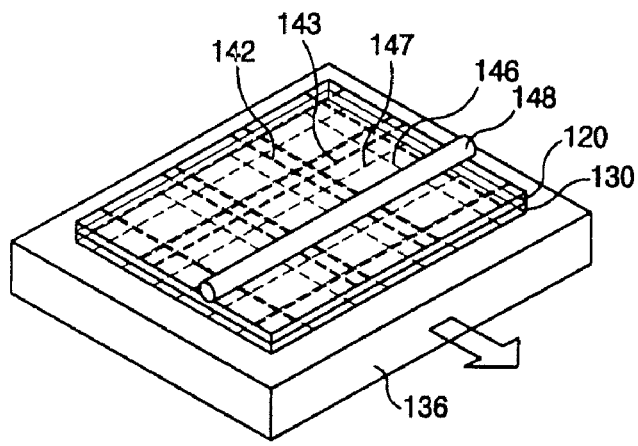

As shown in FIG. 5H, the second and first mother substrates 130 and 120 are overturned to be loaded on a fourth table 136. Subsequently, the fourth table 136 moves in one direction, and propagates a crack on the second mother substrate 130 along the fourth scribing line 147 by pressing the first mother substrate 120 with a breaking rod 148.

Figure 5I:
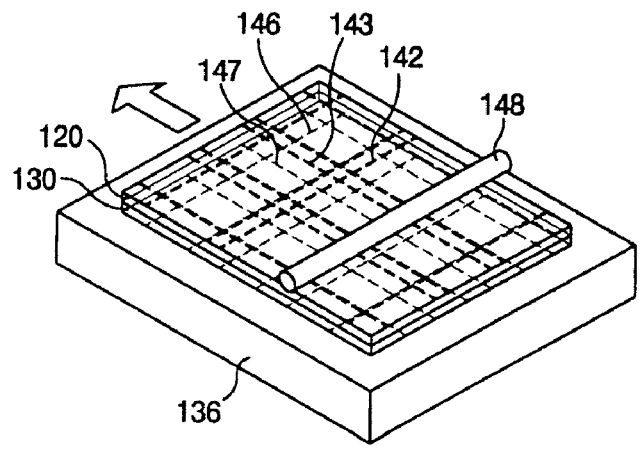

As shown in FIG. 5I, the first and second mother substrates 120 and 130 are turned by about 90°. The fourth table 136 moves back to the initial location, and propagates a crack on the second mother substrate 130 along the third scribing line 146 by pressing the first mother substrate 120 with the breaking rod 148.

Figure 5J:
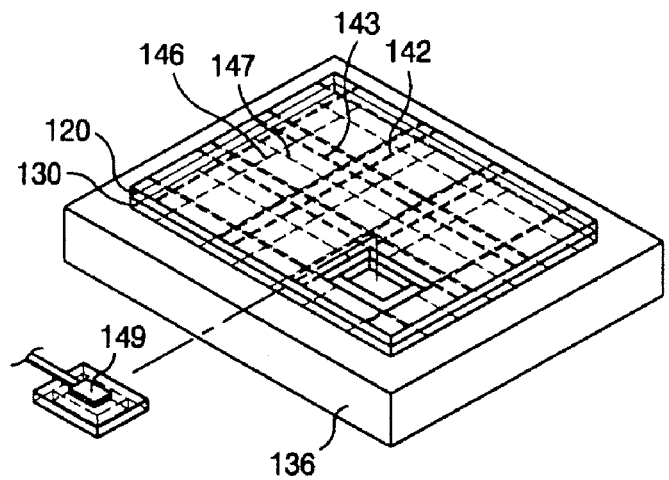

As shown in FIG. 5J, the first and second mother substrates 120 and 130 are cut into a plurality of unit liquid crystal display panels as the cracks are propagated along the first to fourth scribing lines 142, 143, 146, and 147 on the first and second mother substrates 120 and 130. The unit liquid crystal display panels are selectively unloaded by using a suction plate 149 for transferring each unit liquid crystal display panel to equipment for a later process.

In the apparatus and method for cutting liquid crystal display panels according to the first embodiment of the present invention, the first and second mother substrates are turned four times and overturned twice, thereby performing the scribing process four times and the breaking process four times.

Accordingly, two scribing equipments each including a turning unit and two breaking equipments each including a turning unit and an overturning unit are required. This occupies many areas in a working field, thereby causing a waste in the installation cost of the equipment and in the installation space.

Moreover, too much time is taken to the scribing and breaking processes, which eventually decreases productivity.

Figure 6:
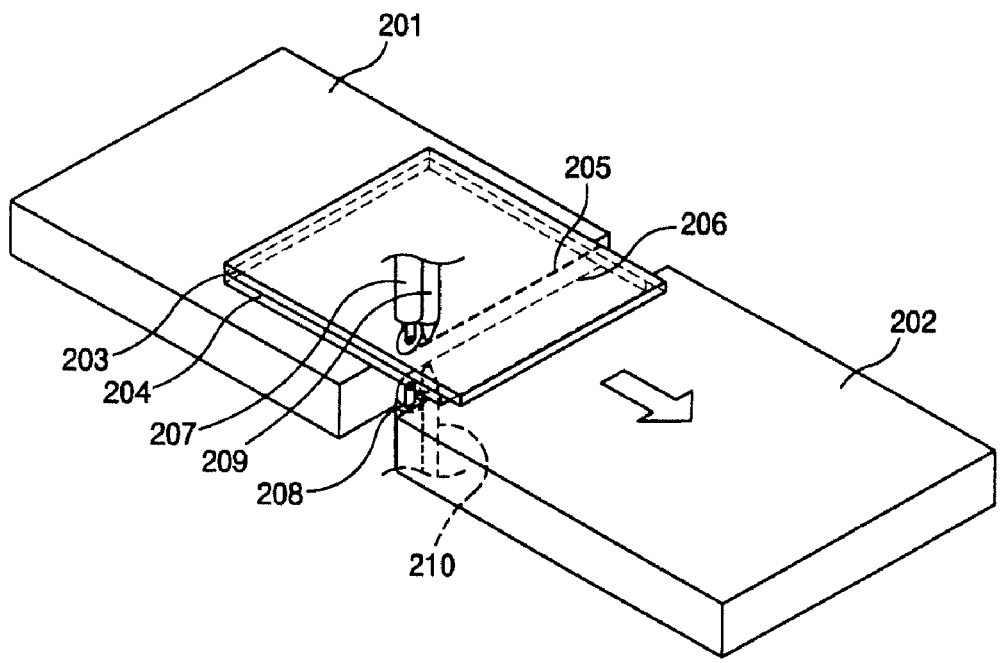
FIG. 6 is a schematic view showing an apparatus for cutting liquid crystal display panels according to a second embodiment of the present invention.

Accordingly, upon consideration of such problems, the apparatus for cutting liquid crystal display panels according to the second embodiment of the present invention is illustrated in FIG. 6.

As shown in FIG. 6, the apparatus for cutting liquid crystal display panels according to the second embodiment of the present invention includes first and second tables 201 and 202 spaced apart from each other, first and second mother substrates 203 and 204 loaded on the first and second tables 201 and 202 while covering the space formed therebetween, first and second cutting wheels 207 and 208 for forming first and second scribing lines 205 and 206 on the surfaces of the first and second mother substrates 203 and 204, and first and second suction units 209 and 210 respectively coupled to the first and second cutting wheels 207 and 208 for sucking in the glass debris generated by the friction between the first and second cutting wheels 207 and 208 and the first and second mother substrates 203 and 204.

In the apparatus for cutting liquid crystal display panels according to the second embodiment of the present invention, the first and second mother substrates 203 and 204 are loaded on the first and second tables 201 and 202 to be placed across the space formed by the first and second tables. Then, the first and second cutting wheels 207 and 208 are rolled onto the first and second mother substrates 203 and 204 with applying a constant pressure in the space formed between the first table 201 and the second table 202, thereby simultaneously forming the first and second scribing lines 205 and 206 having a groove on the surfaces of the first and second mother substrates 203 and 204. The first and second suction units 209 and 210 suck in the glass debris generated on the surfaces of the first and second mother substrates 203 and 204 by the friction between the first and second cutting wheels 207 and 208 and the first and second mother substrates 203 and 204.

Processes for cutting liquid crystal display panels according to the second embodiment of the present invention will be explained with reference to FIGS. 7A to 7F.

Figure 7A:
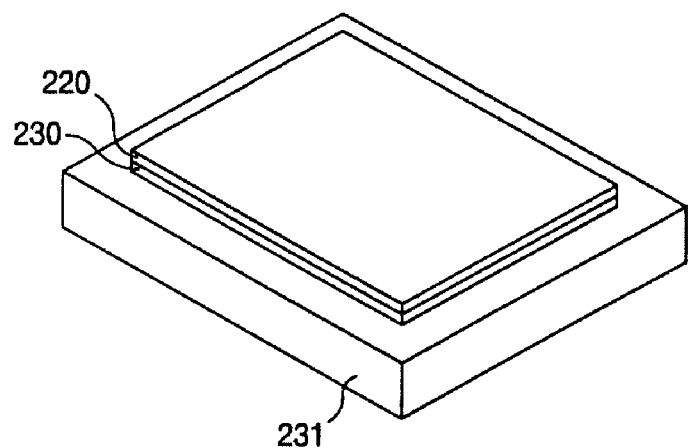
FIGS. 7A to 7F are perspective views sequentially showing a process for cutting the liquid crystal display panels using the apparatus for cutting liquid crystal display panels according to the second embodiment of the present invention.

First, as shown in FIG. 7A, the attached first and second mother substrates 220 and 230 respectively having the thin film transistor array substrates and the color filter substrates are loaded on the first table 231.

The first mother substrate 220 having the thin film transistor array substrates is loaded to be stacked on the second mother substrate 230 having the color filter substrates. Herein, unlike when the second mother substrate 230 is stacked on the first mother substrate 220, an impact applied to the thin film transistor array substrates and the color filter substrates can be attenuated in the process for cutting the first and second mother substrates 220 and 230.

Figure 7B:
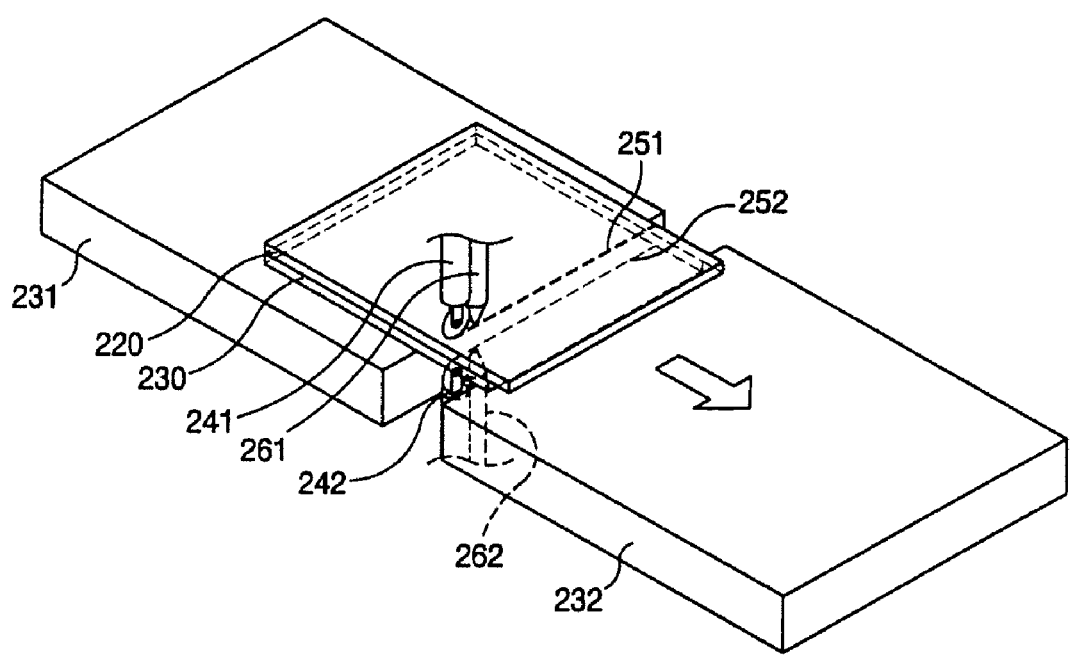

As shown in FIG. 7B, the first and second mother substrates 220 and 230 are positioned on the first and second tables 231 and 232 to be placed across the space formed therebetween. First and second cutting wheels 241 and 242 are rolled onto the surfaces of the first and second mother substrates 220 and 230 with applying a constant pressure at the space formed between the first and second tables 231 and 232, thereby sequentially forming first and second scribing lines 251 and 252 on the surfaces of the first and second mother substrates 220 and 230. At this point, first and second suction units 261 and 262 are coupled to the first and second cutting wheels 241 and 242 to suck in the glass debris generated on the surfaces of the first and second mother substrates 220 and 230 by the friction between the first and second cutting wheels 241 and 242 and the first and second mother substrates 220 and 230.

Figure 7C:
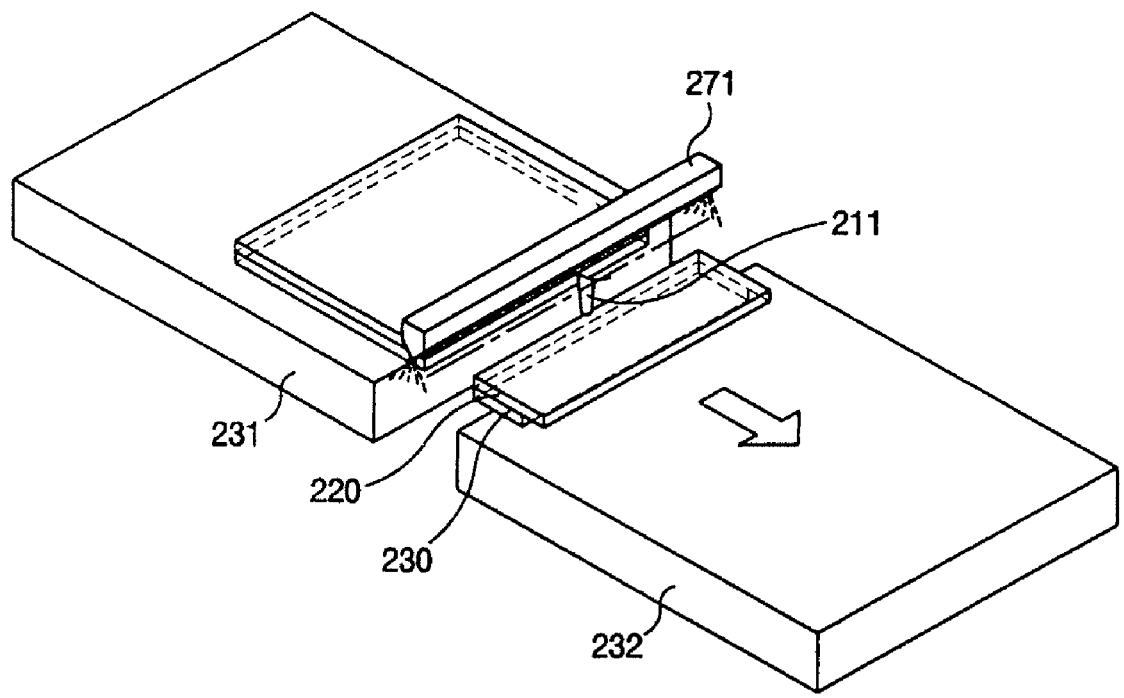

As shown in FIG. 7C, a pressure is applied to the first scribing line 251 or the second scribing line 252 through a first roll 211, thereby sequentially cutting the first and second mother substrates 220 and 230.

The first roll 211 simultaneously applies a pressure to a single part or a plurality of parts of the first scribing line 251 or the second scribing line 252, so that a crack can be propagated on the first and second mother substrates 220 and 230 along the first and second scribing lines 251 and 252.

Additionally, the first roll 211 is coupled to the first cutting wheel 241 or the second cutting wheel 242 to apply a pressure along the first scribing line 251 or the second scribing line 252, thereby applying the pressure to the first scribing line 251 or the second scribing line 252 with more efficiency.

In the meantime, an air curtain 271 is additionally provided above the space formed between the first table 231 and the second table 232. Accordingly, in case that a vertical air current is formed at the space formed between the first table 231 and the second table 232, the first roll 211 applies a pressure to the first scribing line 251 or the second scribing line 252, so that glass debris generated by cutting the bonded first and second mother substrates 220 and 230 are prevented from being adhered to the first and second tables 231 and 232 or the first and second mother substrates 220 and 230.

Figure 7D:
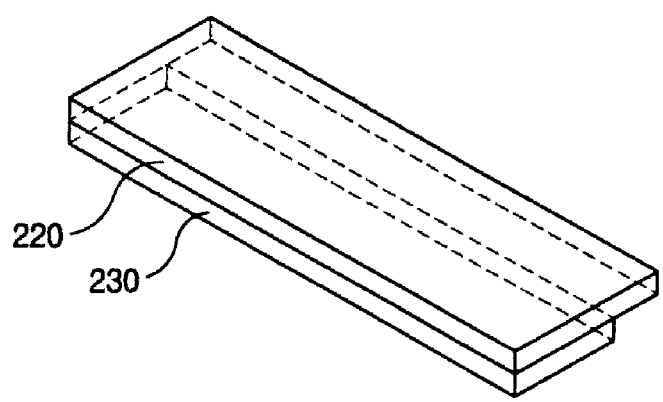

As shown in FIG. 7D, the cut first and second mother substrates 220 and 230 are turned by about 90°.

Figure 7E:
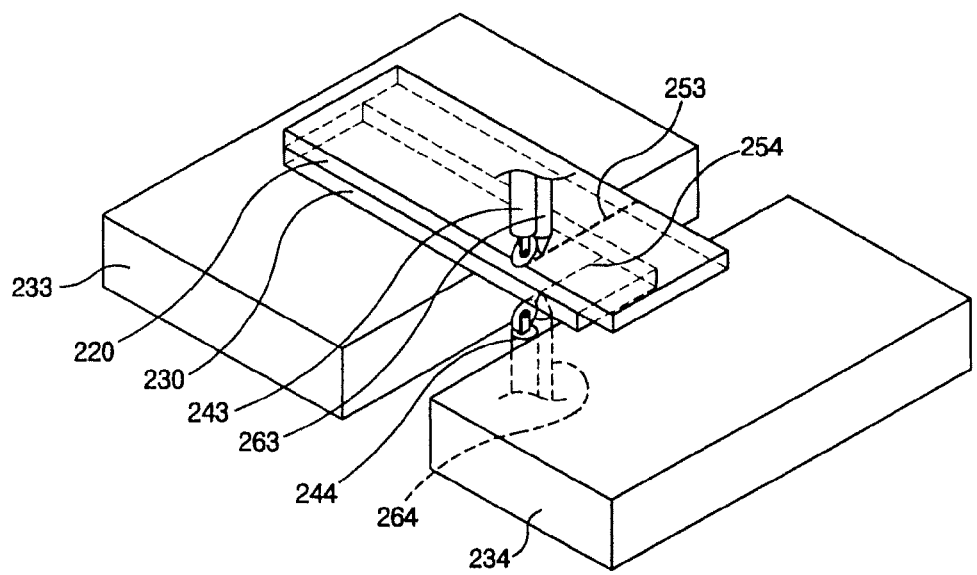

As shown in FIG. 7E, the turned first and second mother substrates 220 and 230 are positioned on third and fourth tables 233 and 234 to be placed across the space formed therebetween. Third and fourth cutting wheels 243 and 244 are bonded to the surfaces of the first and second mother substrates 220 and 230 at a constant pressure to be rotated at the space formed between the third and fourth tables 233 and 234, thereby forming third and fourth scribing lines 253 and 254 on the surfaces of the first and second mother substrates 220 and 230. At this time, third and fourth suction units 263 and 264 are connected with the third and fourth cutting wheels 243 and 244 to suck in the glass debris generated on the surfaces of the first and second mother substrates 220 and 230 by a friction between the third and fourth cutting wheels 243 and 244 and the first and second mother substrates 220 and 230.

Figure 7F:
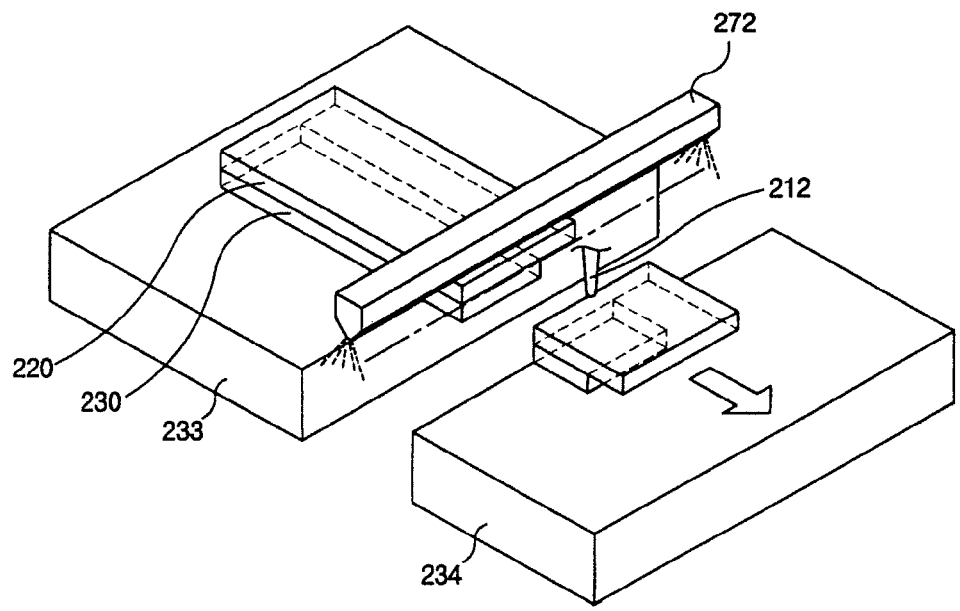

As shown in FIG. 7F, a pressure is applied to the third scribing line 253 or the fourth scribing line 254 through a second roll 212, thereby sequentially cutting the first and second mother substrates 220 and 230.

The second roll 212, similar to the first roll 211 shown in FIG. 7C, simultaneously applies a pressure to a single part or a plurality of parts of the third scribing line 253 or the fourth scribing line 254, so that a crack can be propagated on the first and second mother substrates 220 and 230 along the third and fourth scribing lines 253 and 254. Also, it is possible that the second roll 212 is connected with the third cutting wheel 243 or the fourth cutting wheel 244 to apply a pressure along the third scribing line 253 or the fourth scribing line 254, thereby applying a pressure to the third scribing line 253 or the fourth scribing line 254 with more efficiency.

In the meantime, an air curtain 272 is additionally provided above the space formed between the third table 233 and the fourth table 234. Accordingly, in case that a vertical air current is formed at the space formed between the third table 233 and the fourth table 234, the second roll 212 applies a pressure to the third scribing line 253 or the fourth scribing line 254, so that the glass debris generated by cutting the bonded first and second mother substrates 220 and 230 are prevented from being adhered to the third and fourth tables 233 and 234 or the first and second mother substrates 220 and 230.

The unit liquid crystal display panels cut along the first to fourth scribing lines 251 to 254 are transferred to equipment for a later process by an unloading unit.

In the apparatus and method for cutting liquid crystal display panels according to the second embodiment of the present invention, the first and second mother substrates are turned once and the first and second mother substrates are scribed twice at the same time, thereby forming the scribing lines. At this time, the glass debris generated on the surfaces of the mother substrates by the friction between the cutting wheel and the mother substrates are removed by a suction unit coupled to the cutting wheel, and a pressure is applied to at least one part of the scribing lines by the roll. Thus, the mother substrates are cut into unit liquid crystal display panels.

Accordingly, unlike in the first embodiment, in the apparatus and method for cutting liquid crystal display panels according to the second embodiment of the present invention, an apparatus is simplified to minimize the installation cost and the installation space, thereby reducing the time required to cut the unit liquid crystal display panels and increasing productivity.

In the meantime, the unit liquid crystal display panels of the thin film transistor array substrate and the color filter substrate bonded to each other are formed on the mother substrates with a predetermined interval. Also, a dummy seal pattern for preventing a distortion of the mother substrates is formed at the end portions of the first and second mother substrates where the unit liquid crystal display panels are not formed.

In case that the second embodiment of the present invention is applied to cut the mother substrates where the dummy seal pattern is formed, there is a problem in that the mother substrates may not be easily separated from the unit liquid crystal display panels.

Figure 8:
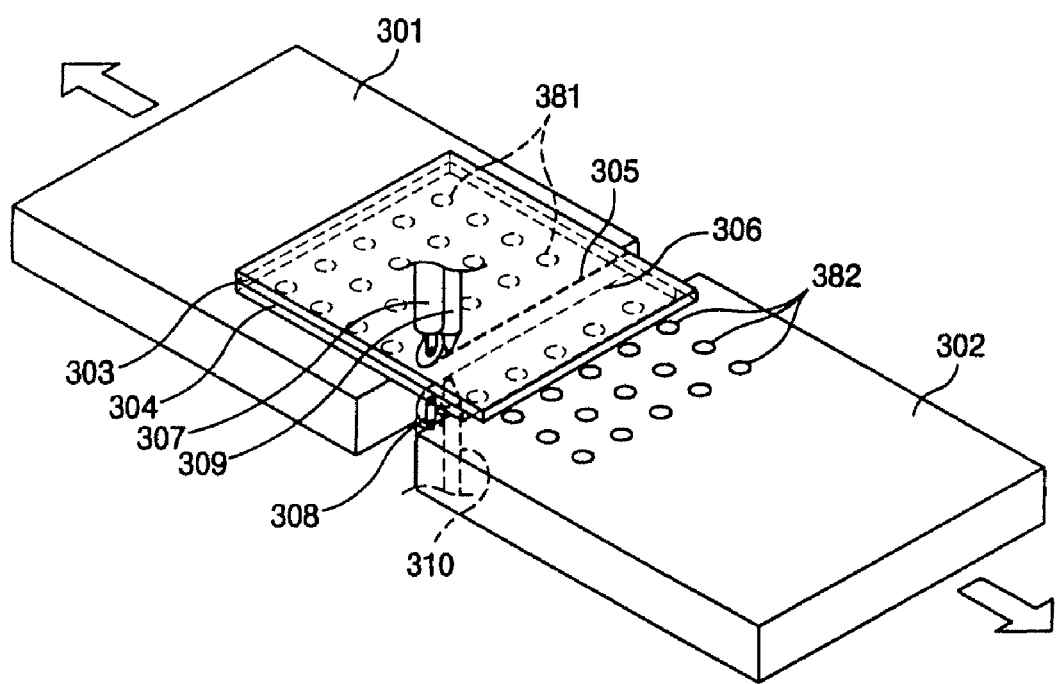
FIG. 8 is a schematic view showing an apparatus for cutting liquid crystal display panels according to a third embodiment of the present invention.

Therefore, an apparatus for cutting liquid crystal display panels according to a third embodiment of the present invention is illustrated in FIG. 8, so as to cut the mother substrates where the dummy seal pattern is formed and separated more efficiently.

As shown in FIG. 8, the apparatus for cutting liquid crystal display panels according to the third embodiment of the present invention includes first and second tables 301 and 302 spaced apart from each other, first and second suction holes 381 and 382 disposed on the surfaces of the first and second tables 301 and 302, first and second mother substrates 303 and 304 loaded on the first and second tables 301 and 302 to be placed across the space formed therebetween, first and second cutting wheels 307 and 308 for forming first and second scribing lines 305 and 306 on the surfaces of the first and second mother substrates 303 and 304, and first and second suction units 309 and 310 respectively provided at the first and second cutting wheels 307 and 308 for sucking in the glass debris generated by the friction between the first and second cutting wheels 307 and 308 and the first and second mother substrates 303 and 304.

In the apparatus for cutting liquid crystal display panels according to the third embodiment of the present invention, the first and second mother substrates 303 and 304 are loaded on the first and second tables 301 and 302 in order to be placed across the space formed therebetween. Then, the first and second cutting wheels 307 and 308 are rolled onto the surfaces of the first and second mother substrates 303 and 304 with applying a constant pressure to be rotated in the space formed between the first table 301 and the second table 302, thereby simultaneously forming the first and second scribing lines 305 and 306 having a groove. The first and second suction units 309 and 310 are coupled to the first and second cutting wheels 307 and 308, thereby sucking the glass debris generated on the surfaces of the first and second mother substrates 303 and 304 by the friction between the first and second cutting wheels 307 and 308 and the first and second mother substrates 303 and 304.

In the meantime, according to the apparatus and method for cutting liquid crystal display panels of the second embodiment of the present invention, a pressure is applied to the first scribing line 205 or the second scribing line 206 through the first and second rolls 211 and 212 in order to cut the first and second mother substrates 203 and 204 along the first and second scribing lines 205 and 206 formed on the surfaces of the first and second mother substrates 203 and 204.

In the apparatus and method for cutting liquid crystal display panels according to the third embodiment of the present invention, the first and second suction holes 381 and 382 disposed on the surfaces of the first and second tables 301 and 302 are used to hold the first and second mother substrates 303 and 304 in cutting them along the first and second scribing lines 305 and 306 formed at the surfaces of the first and second mother substrates 303 and 304.

More specifically, the first and second mother substrates 303 and 304 are held by the first and second suction holes 381 and 382 disposed on the surfaces of the first and second tables 301 and 302. Then, after forming the first and second scribing lines 305 and 306, the first and second tables 301 and 302 each move to a different direction to cut the first and second mother substrates 303 and 304 along the first and second scribing lines 305 and 306.

Processes for cutting liquid crystal display panels by applying the third embodiment of the present invention will be explained with reference to FIGS. 9A to 9F.

Figure 9A:
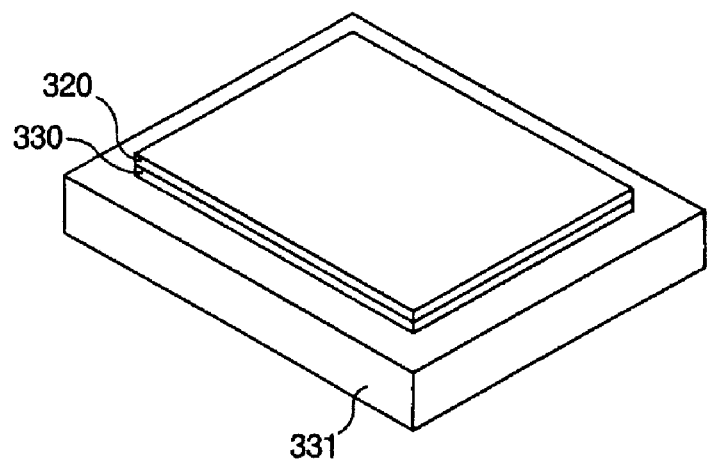
FIGS. 9A to 9F are perspective views sequentially showing a process for cutting liquid crystal display panels by using the apparatus for cutting liquid crystal display panels according to the third embodiment of the present invention.

First, as shown in FIG. 9A, the attached first and second mother substrates 320 and 330 respectively having the thin film transistor array substrates and the color filter substrates are loaded on the first table 331.

The first mother substrate 320 having the thin film transistor array substrates is loaded to be stacked on the second mother substrate 330 having the color filter substrates. Accordingly, an impact applied to the thin film transistor array substrates or the color filter substrates can be more attenuated in the process for cutting the first and second mother substrates 320 and 330, as compared to when the second substrate 330 is stacked on the first mother substrate 320.

Figure 9B:
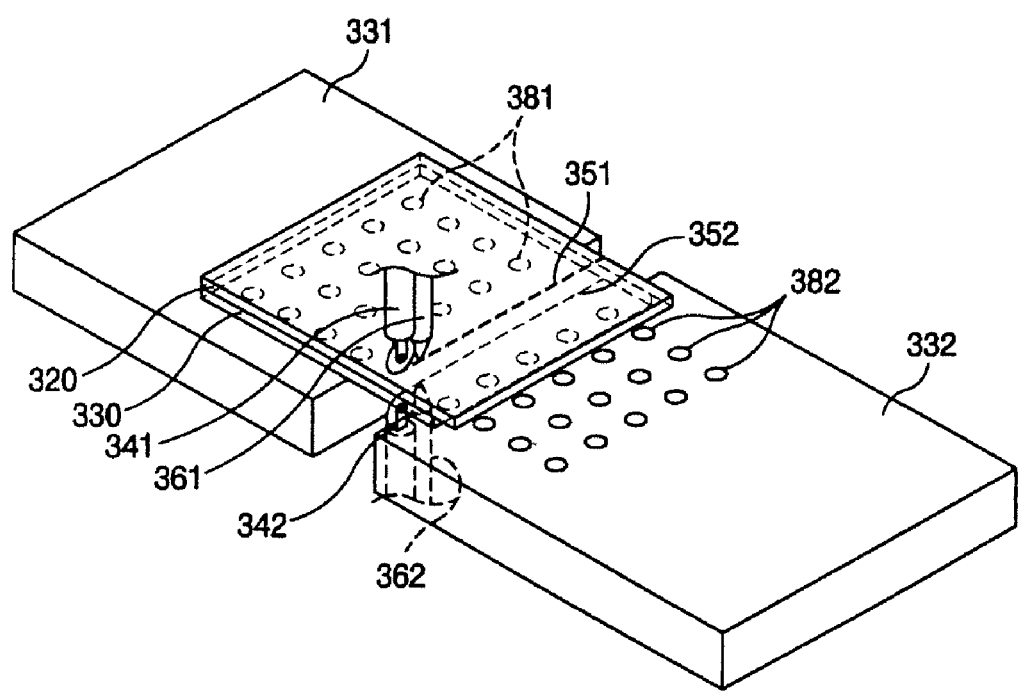

As shown in FIG. 9B, the first and second mother substrates 320 and 330 are positioned on the first and second tables 331 and 332 to be placed across the space formed therebetween. Then, the first and second mother substrates are held by the first and second suction holes 381 and 382 disposed on the surfaces of the first and second tables 331 and 332. Subsequently, first and second cutting wheels 341 and 342 are rolled onto the surfaces of the first and second mother substrates 320 and 330 with applying a constant pressure in the space formed between the first and second tables 331 and 332, thereby sequentially forming first and second scribing lines 351 and 352 at the surfaces of the first and second mother substrates 320 and 330. At this time, first and second suction units 361 and 362 are coupled to the first and second cutting wheels 341 and 342 to suck the glass debris generated on the surfaces of the first and second mother substrates 320 and 330 by the friction between the first and second cutting wheels 341 and 342 and the first and second mother substrates 320 and 330.

Figure 9C:
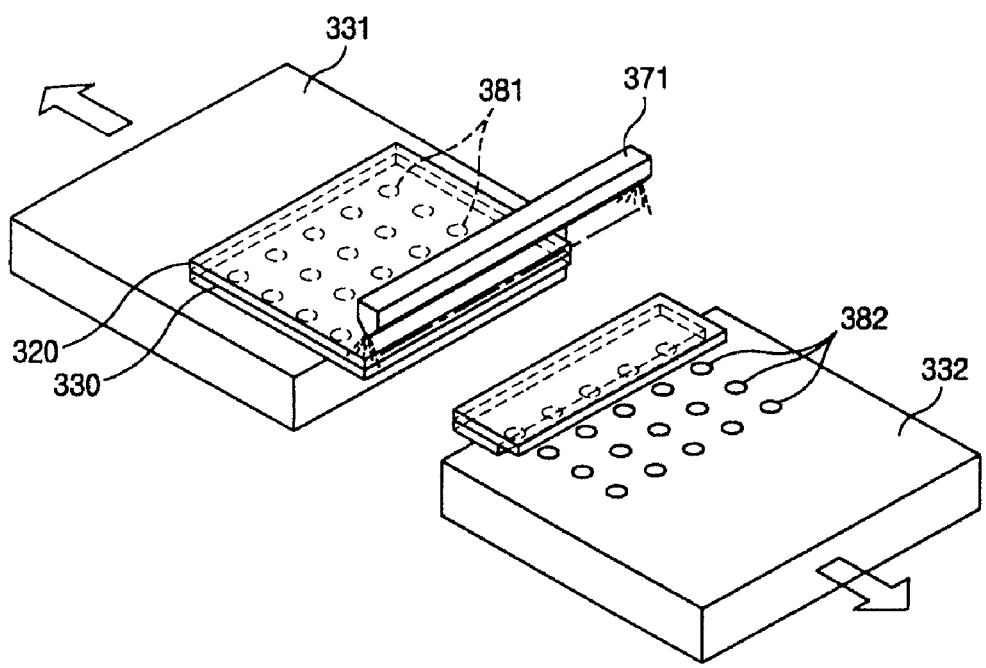

As shown in FIG. 9C, the first and second tables 331 and 332 loaded the first and second mother substrates 320 and 330 held by the first and second suction holes 381 and 382 each moves to the opposite directions, thereby sequentially cutting the first and second mother substrates 320 and 330 along the first and second scribing lines 351 and 352.

Figure 10A:
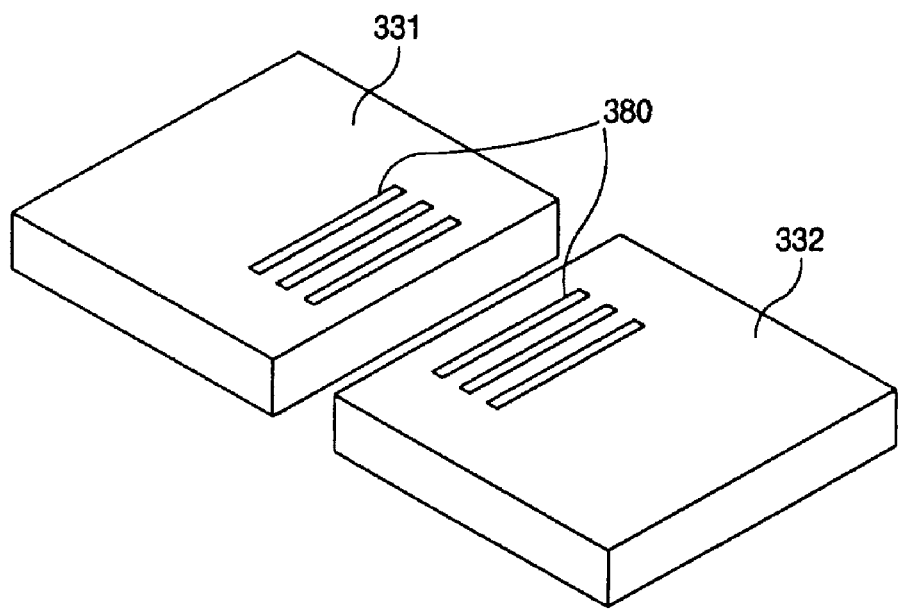
FIGS. 10A and 10B are schematic views showing another example of a suction hole used in the third embodiment of the present invention.

The first and second suction holes 381 and 382 suck the air in order to tightly hold the first and second mother substrates 320 and 330 onto the first and second tables 331 and 332. On the other hand, the first and second suction holes 381 and 382 inject the air to separate the first and second mother substrates 320 and 330 from the first and second tables 331 and 332, thereby transferring the first and second mother substrates 320 and 330. Also, the first and second suction holes 381 and 382, as shown in FIG. 10A, are formed in the same shape as the suction unit 380 at the surfaces of the first and second tables 331 and 332, thereby sucking the first and second mother substrates 320 and 330 more effectively. On the other hand, when a vacuum condition is maintained at a high state, the first and second suction holes 381 and 382 prevent black dot stains from being formed on the first and second mother substrates 320 and 330.

In the meantime, an air curtain 371 is additionally provided above the space formed between the first table 331 and the second table 332. Accordingly, in case that a vertical air current is formed at the space formed between the first table 331 and the second table 332, the first and second tables 331 and 332 move to different directions, thereby preventing the glass debris generated by cutting the bonded first and second mother substrates 320 and 330 from being adhered to the first and second tables 331 and 332 or the first and second mother substrates 320 and 330.

Figure 9D:
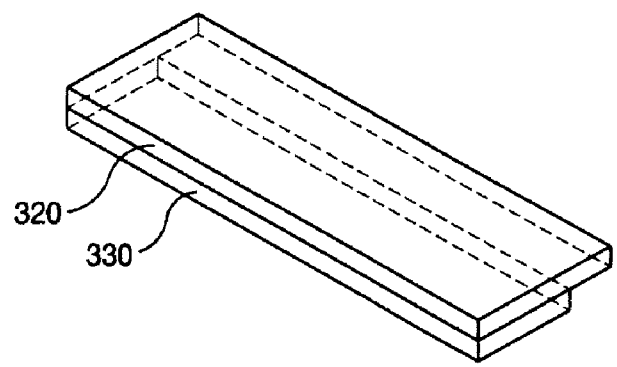

As shown in FIG. 9D, the separated first and second mother substrates 320 and 330 are turned by about 90°.

Figure 9E:
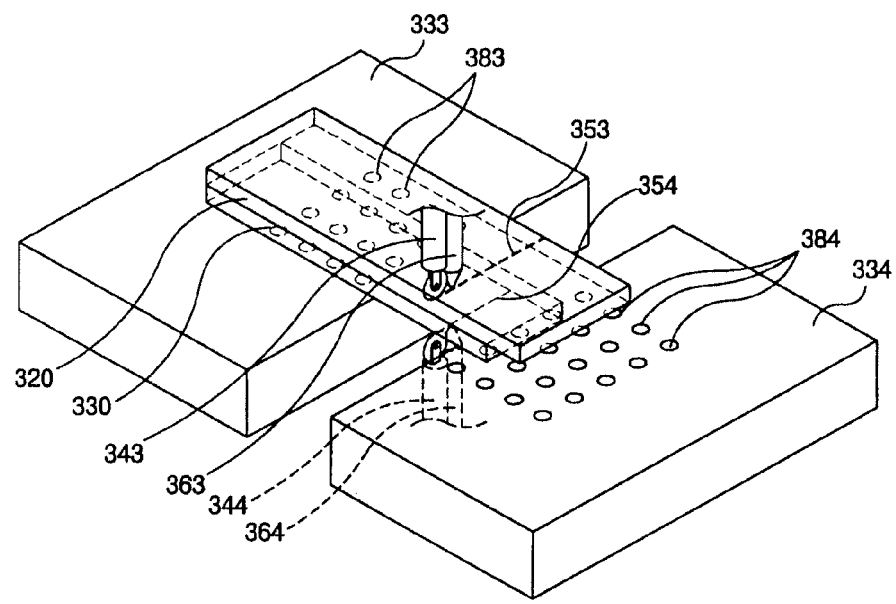

As shown in FIG. 9E, the turned first and second mother substrates 320 and 330 are positioned on third and fourth tables 333 and 334 in order to be placed across the space formed therebetween to be held by third and fourth suction holes 383 and 384 disposed on the surfaces of the third and fourth tables 333 and 334. Then, third and fourth cutting wheels 343 and 344 are rolled onto the surfaces of the first and second mother substrates 320 and 330 with applying a constant pressure in the space formed between the third table 333 and the fourth table 334, thereby sequentially forming third and fourth scribing lines 353 and 354 on the surfaces of the first and second mother substrates 320 and 330. At this time, third and fourth suction units 363 and 364 are coupled to the third and fourth cutting wheels 343 and 344 to suck in the glass debris generated on the surfaces of the first and second mother substrates 320 and 330 by the friction between the third and fourth cutting wheels 343 and 344 and the first and second mother substrates 320 and 330.

Figure 9F:
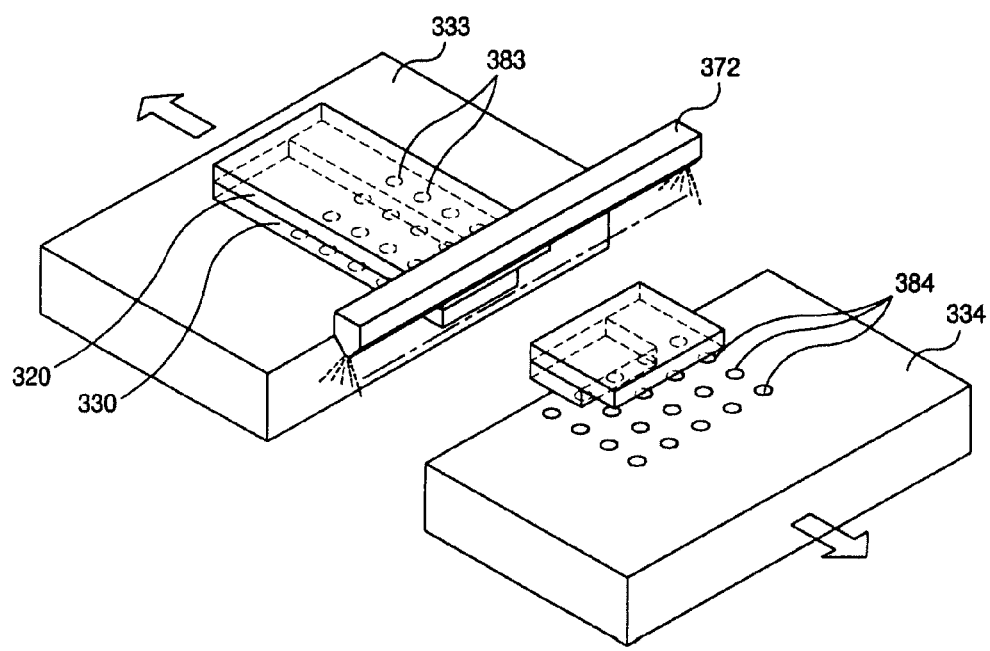

As shown in FIG. 9F, the third and fourth tables 333 and 334 loaded the first and second mother substrates 320 and 330 held by the third and fourth suction holes 383 and 384 move to the opposite directions, thereby sequentially cutting the first and second mother substrates 320 and 330 and separating from each other along the third and fourth scribing lines 353 and 354.

Figure 10B:
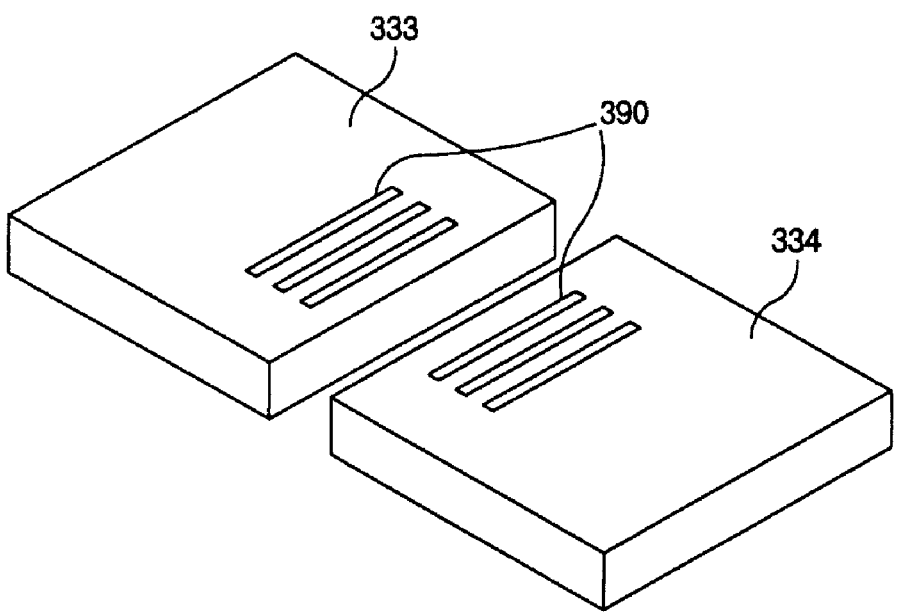

The third and fourth suction holes 383 and 384, similar to the first and second suction holes 381 and 382 of FIG. 9C, suck in the air to tightly hold the first and second mother substrates 320 and 330 onto the third and fourth tables 333 and 334. On the other hand, the third and fourth suction holes 383 and 384 inject the air to separate the first and second mother substrates 320 and 330 from the third and fourth tables 333 and 334, thereby transferring the first and second mother substrates. Also, the third and fourth suction holes 383 and 384, as shown in FIG. 10B, are formed in the same shape as the suction unit 390 at the surfaces of the third and fourth tables 333 and 334, thereby sucking in the first and second mother substrates 320 and 330 more effectively. Besides, when a vacuum condition is maintained at a high state, the third and fourth suction holes 383 and 384 prevent black dot stains from being formed on the first and second mother substrates 320 and 330.

In the meantime, an air curtain 372 is additionally provided above the space formed between the third table 333 and the fourth table 334, similar to the air curtain 371 provided above the space formed between the first and second tables 331 and 332. Accordingly, in case that a vertical air current is formed at the space formed between the third table 333 and the fourth table 334, the third and fourth tables 333 and 334 move to the opposite directions, thereby preventing the glass debris generated by cutting the bonded first and second mother substrates 320 and 330 from being adhered to the third and fourth tables 333 and 334 or the first and second mother substrates 320 and 330.

The unit liquid crystal display panels, which are cut along the first to fourth scribing lines 351 to 354, are transferred to equipment for a later process.

In the apparatus and method for cutting liquid crystal display panels according to the third embodiment of the present invention, the first and second mother substrates are turned once and the first and second mother substrates are scribed twice at the same time, thereby forming the scribing lines. At this time, the glass debris generated on the surfaces of the mother substrates are removed by the suction unit connected to the cutting wheel, and the first and second tables or the third and fourth tables loaded on the mother substrates move to the opposite directions, thereby cutting the mother substrates into unit liquid crystal display panels.

Accordingly, in the apparatus and method for cutting liquid crystal display panels according to the third embodiment of the present invention, as compared to those of the first embodiment of the present invention, the apparatus is simplified to minimize the installation cost and the installation space, thereby reducing the processing time taken to cut the unit liquid crystal display panels and increasing productivity.

Also, in the apparatus for cutting liquid crystal display panels according to the third embodiment of the present invention, the mother substrates having the dummy seal pattern can be cut and separated more efficiently.

In the meantime, the processes for cutting unit liquid crystal display panels from the mother substrates shown in the second and third embodiments of the present invention include a first cutting process for cutting and removing a dummy region where the unit liquid crystal display panels are not formed from the mother substrates, and a second cutting process for cutting a region where the unit liquid crystal display panels are formed from the mother substrates.

Figure 11A:
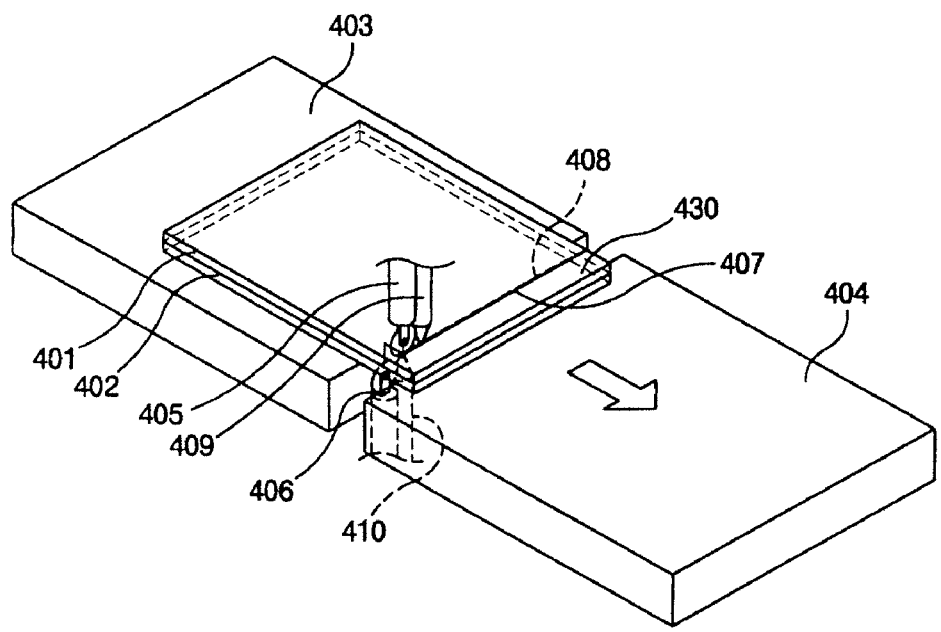
FIGS. 11A and 11B are perspective views showing a process for cutting liquid crystal display panels with the second or third embodiments of the present invention in more detail.

In the first cutting process, as shown in FIG. 11A, the first and second mother substrates 401 and 402 are positioned on the first and second tables 403 and 404 so as to be placed across the space formed therebetween, thereby forming first and second scribing lines 407 and 408 by first and second cutting wheels 405 and 406. At this time, first and second suction units 409 and 410 are coupled to the first and second cutting wheels 405 and 406 to suck in the glass debris generated on the surfaces of the first and second mother substrates 401 and 402 by the friction between the first and second cutting wheels 405 and 406 and the first and second mother substrates 401 and 402.

Similar to the second embodiment of the present invention, a pressure is applied to the first scribing line 407 or the second scribing line 408 through a roll (not shown). Alternatively, similar to the third embodiment of the present invention, the first and second tables 403 and 404 having the first and second mother substrates 401 and 402 move to the opposite directions, thereby cutting the dummy region 430 of a side where the unit liquid crystal display panels are not formed from the first and second mother substrates 401 and 402.

Figure 11B:
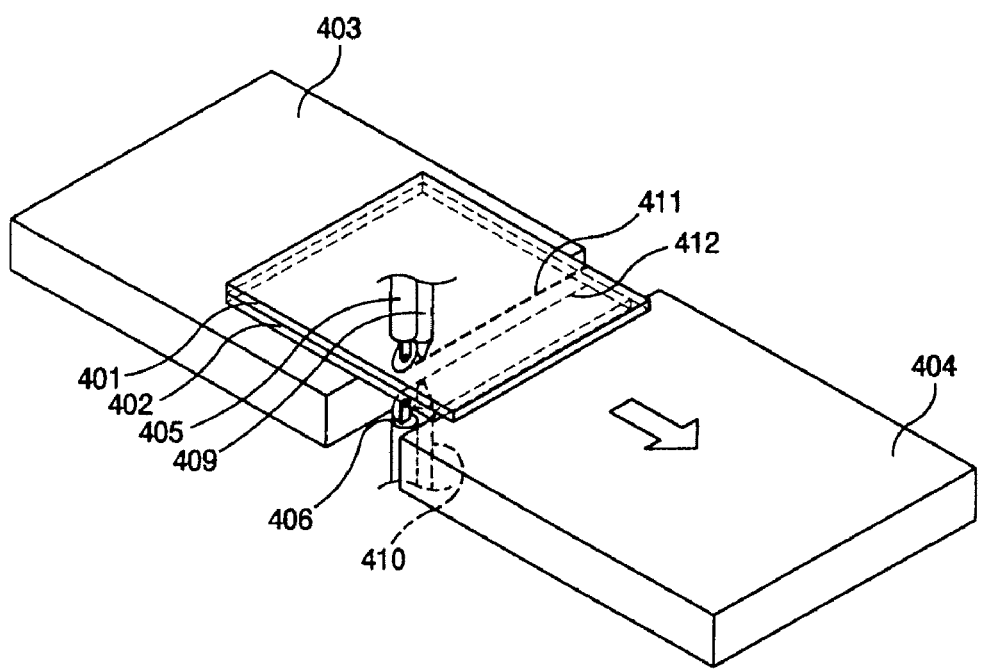

Then, in the second cutting process, as shown in FIG. 11B, the first and second mother substrates 401 and 402, in which the dummy region 430 is removed by the first cutting process, are positioned on the first and second tables 403 and 404 to be placed across the space formed therebetween, thereby forming third and fourth scribing lines 411 and 412 by the first and second cutting wheels 405 and 406. Then, similar to the second embodiment of the present invention, a pressure is applied to the third scribing line 411 or the fourth scribing line 412 through a roll (not shown). Alternatively, similar to the third embodiment of the present invention, the first and second tables 403 and 404 having the first and second mother substrates 401 and 402 move to the opposite directions, thereby cutting the unit liquid crystal display panels from the first and second mother substrates 401 and 402.

Subsequently, the first cutting process for cutting the dummy region 430 from the first and second mother substrates 401 and 402 is performed, and the second cutting process for cutting the unit liquid crystal display panels from the first and second mother substrates 401 and 402 is repeatedly performed.

However, when the second embodiment of the present invention is applied, the dummy region 430 or the unit liquid crystal display panels may not be separated from the first and second mother substrates 401 and 402 in the first cutting process or in the second cutting process due to the dummy seal pattern for preventing a distortion formed at the edge areas of the first and second mother substrates 401 and 402 where the unit liquid crystal display panels are not formed.

Also, when the third embodiment of the present invention is applied, in the second cutting process, areas of the unit liquid crystal display panels are wide enough to hold the first and second mother substrates 401 and 402 into the first and second tables 403 and 403 and separate from each other. However, in the first cutting process, since the area of the dummy area 430 may be too narrow, the dummy region 430 of the first and second mother substrates 401 and 402 cannot be stuck onto the first and second tables 403 and 404.

Figure 12:
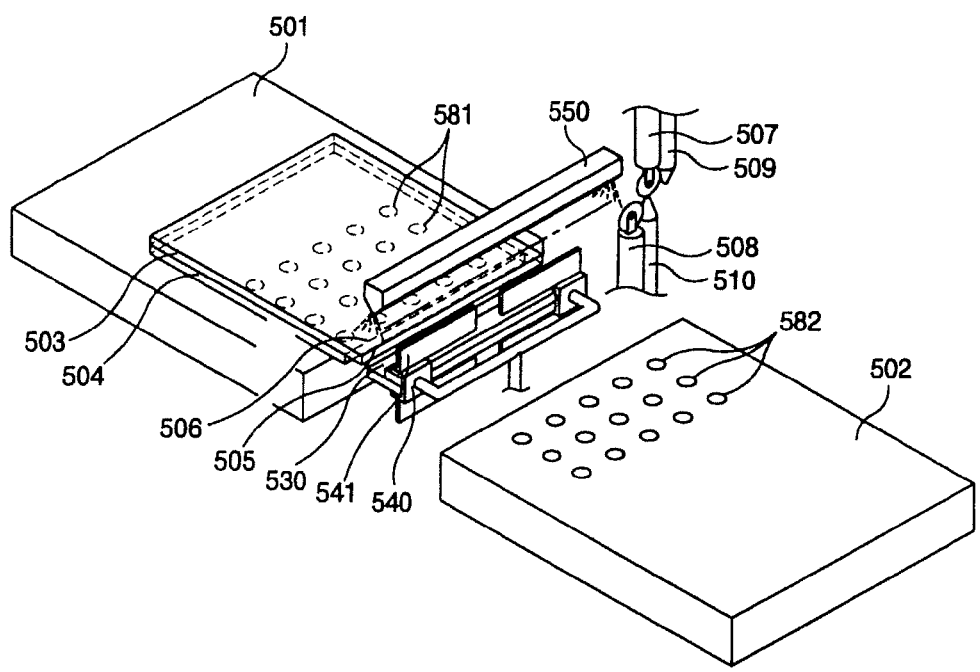
FIG. 12 is a schematic view showing an apparatus for cutting liquid crystal display panels according to a fourth embodiment of the present invention.

An apparatus for cutting liquid crystal display panels according to a fourth embodiment of the present invention illustrated in FIG. 12 is to solve such problems.

As shown in FIG. 12, the apparatus for cutting liquid crystal display panels according to the fourth embodiment of the present invention includes first and second tables 501 and 502 spaced apart from each other, first and second suction holes 581 and 582 disposed on the surfaces of the first and second tables 501 and 502, first and second mother substrates 503 and 504 loaded on the first and second tables 501 and 502 to be placed across the space formed therebetween, first and second cutting wheels 507 and 508 for forming first and second scribing lines 505 and 506 at the surfaces of the first and second mother substrates 503 and 504, first and second suction units 509 and 510 respectively provided at the first and second cutting wheels 507 and 508 for sucking in the glass debris generated by the friction between the first and second cutting wheels 507 and 508 and the first and second mother substrates 503 and 504, and a robot grip 540 provided at the space formed between the first and second tables 501 and 502 for removing the dummy region 530 of the first and second mother substrates 503 and 504 along the first and second scribing lines 505 and 506.

In the apparatus for cutting liquid crystal display panels according to the fourth embodiment of the present invention, the first and second mother substrates 503 and 504 are loaded on the first and second tables 501 and 502 to be placed across the space formed therebetween. Then, the first and second cutting wheels 507 and 508 are rolled onto the surfaces of the first and second mother substrates 503 and 504 at the space formed between the first table 501 and the second table 502, thereby simultaneously forming the first and second scribing lines 505 and 506 having a groove. The first and second suction units 509 and 510 are coupled to the first and second cutting wheels 507 and 508 to suck in the glass debris generated on the surfaces of the first and second mother substrates 503 and 504.

In the meantime, according to the apparatus and method for cutting liquid crystal display panels according to the third embodiment of the present invention, the first and second mother substrates 303 and 304 are held by the first and second suction holes 381 and 382 disposed on the surfaces of the first and second tables 301 and 302. Then, forming the first and second scribing lines 305 and 306, the first and second tables 301 and 302 move to the opposite directions, thereby cutting the first and second mother substrates 303 and 304 along the first and second scribing lines 305 and 306.

However, as explained with reference to FIGS. 11A and 11B, since the area of the dummy region 430 may be too narrow, the dummy region 430 of the first and second mother substrates 401 and 402 cannot be stuck on the first and second tables 403 and 404.

In the meantime, according to the apparatus and method for cutting liquid crystal display panels according to the fourth embodiment of the present invention, as shown in FIG. 12, the robot grip 540 is provided at the space formed between the first table 501 and the second table 502, thereby selectively separating the dummy region 530 from the first and second mother substrates 503 and 504.

In order to easily separate the dummy region 530 from the first and second mother substrates 503 and 504 by the robot grip 540, the first and second scribing lines 505 and 506 are formed by the first and second cutting wheels 507 and 508, and then a pressure is applied to the first scribing line 505 or the second scribing line 506 by a roll to propagate a crack, as shown in the second embodiment.

The liquid crystal display panel may have a different size according to a model. Therefore, it is desirable to control the width of the robot grip 540 by using a sub motor and etc.

Also, in case that the first mother substrate 503 having the thin film transistor array substrates is stacked on the second mother substrate 504 having the color filter substrates, the thin film transistor substrates are protruded from the color filter substrates. Accordingly, the robot grip 540 is constructed to hold the dummy region 530 at a location lower than the first and second mother substrates 503 and 504. On the other hand, the robot grip 540 has to grip the dummy region 530 at a location higher than the first and second mother substrates 503 and 504 to prevent an impact applied to the unit liquid crystal display panels in advance. To this end, the robot grip 540 may be fabricated to control the height thereof by using a servomotor.

In the meantime, when the robot grip 540 separates the dummy region 530 selectively from the first and second mother substrates 503 and 504 at the space formed between the first table 501 and the second table 502, the glass debris may be generated and adhered to the surface of the second table 502.

In case that the glass debris are adhered to the surface of the second table 502, a scratch or stain may appear on the surface of the first mother substrate 503 when the cut liquid crystal display panels are loaded on the second table 502.

Accordingly, a cover 541 is additionally coupled to the robot grip 540 to prevent the glass debris from being adhered to the second table 502.

The cover 541 can be attached to the robot grip 540 by an adhesion method, or can be mounted thereon and detached therefrom by a pin insertion method. Also, the cover 541 can prevent a damage caused by collisions with other components by using a urethane or vinyl material. Also, the cover 541 may be formed to be divided into two parts with respect to the middle location of the robot grip 540 having a separation margin so that a width of the robot grip 540 can be varied according to a size of the liquid crystal display panel.

In the meantime, the cover 541 is attached to the robot grip 540 and a vertical air current is additionally formed at the space formed between the first table 501 and the second table 502 by providing an air curtain 550 above the space formed between the first table 501 and the second table 502, so that the glass debris, generated when the robot grip 540 separates the dummy region 530 selectively from the first and second mother substrates 503 and 504 at the space formed between the first table 501 and the second table 502, is effectively prevented from being adhered to the surface of the second table 502.

As aforementioned, in the apparatus for cutting liquid crystal display panels according to the present invention, the glass debris generated in the process for cutting the large mother substrates into the unit liquid crystal display panels can be prevented from being adhered to the surface of the mother substrate or the table on which the mother substrate is loaded.

Accordingly, a scratch or stain is prevented from being formed on the surface of the liquid crystal display panel, thereby increasing a picture quality of the liquid crystal display panel, reducing the defects of a product, and thus improving productivity.

It will be apparent to those skilled in the art that various modifications and variations can be made in the apparatus for cutting the liquid crystal display panel of the present invention without departing from the spirit or scope of the inventions. Thus, it is intended that the present invention covers the modifications and variations of this invention provided they come within the scope of the appended claims and their equivalents.

What is claimed is:

1. A method of manufacturing a liquid crystal display comprising:
   providing first and second mother substrates to bond each other, wherein the first mother substrate having a thin film transistor array substrates is loaded to be stacked on the second mother substrate having a color filter substrates;
   loading the first and second mother substrates on first and second tables with covering a first space formed between the first and second tables;
   forming first and second scribing lines on the surfaces of the first and second mother substrates with first and second cutting wheels;
   suctioning debris caused by the forming step using first and second suction units, wherein the first and second suction units are disposed behind the first and second cutting wheels, respectively;
   forming vertical air current at the first space by an air curtain provided above the first space; and
   applying pressure onto the first scribing line or the second scribing line through a first roll, thereby sequentially cutting the first and second mother substrates.

2. The method of claim 1, further comprising turning the cut first and second mother substrates by 90°.

3. The method of claim 2, further comprising loading the turned first and second mother substrates on third and fourth tables with covering a second space formed between the third and fourth tables.

4. The method of claim 3, further comprising forming third and fourth scribing lines on the surfaces of the first and second mother substrates with third and fourth cutting wheels.

5. The method of claim 4, further comprising suctioning debris caused by the forming step using third and fourth suction units, wherein the third and fourth suction units are disposed behind the third and fourth cutting wheels, respectively.

6. The method of claim 5, further comprising forming vertical air current at the second space by an air curtain provided above the second space.

7. The method of claim 6, further comprising applying pressure onto the third scribing line or the fourth scribing line through a second roll, thereby sequentially cutting the first and second mother substrates.

* * * * *